(12) United States Patent
Lamkin et al.

(10) Patent No.: US 7,346,920 B2
(45) Date of Patent: Mar. 18, 2008

(54) SYSTEM, METHOD AND ARTICLE OF MANUFACTURE FOR A COMMON CROSS PLATFORM FRAMEWORK FOR DEVELOPMENT OF DVD-VIDEO CONTENT INTEGRATED WITH ROM CONTENT

(75) Inventors: Allan B. Lamkin, San Diego, CA (US); Todd R. Collart, Los Altos, CA (US)

(73) Assignee: Sonic Solutions, a California corporation, Novato, CA (US)

( * ) Notice: Subject to any disclaimer, the term of this patent is extended or adjusted under 35 U.S.C. 154(b) by 903 days.

(21) Appl. No.: 09/898,479

(22) Filed: Jul. 2, 2001

(65) Prior Publication Data

US 2002/0088011 A1    Jul. 4, 2002

Related U.S. Application Data

(60) Provisional application No. 60/216,822, filed on Jul. 7, 2000.

(51) Int. Cl.
*H04N 7/173* (2006.01)
(52) U.S. Cl. .................. 725/112; 725/113; 725/133; 725/153; 386/125; 386/126
(58) Field of Classification Search ............... 725/135, 725/133, 141, 153, 110, 112–113; 707/10, 707/200, 205; 715/500.1, 501.1; 369/30.01, 369/13.56; 386/95, 124–126, 83; 705/27, 705/1, 5, 10; 709/217–219
See application file for complete search history.

(56) References Cited

U.S. PATENT DOCUMENTS

| 4,672,572 | A | 6/1987 | Alsberg |
| 4,709,813 | A | 12/1987 | Wildt |
| 4,710,754 | A | 12/1987 | Montean |
| 4,739,510 | A | 4/1988 | Jeffers et al. |
| 4,785,472 | A | 11/1988 | Shapiro |
| 4,888,638 | A | 12/1989 | Bohn |
| 4,967,185 | A | 10/1990 | Montean |
| 4,993,068 | A | 2/1991 | Piosenka et al. |

(Continued)

FOREIGN PATENT DOCUMENTS

DE            42 42 992 A1    6/1994

(Continued)

OTHER PUBLICATIONS

U.S. Appl. No. 10/860,351, filed Jun. 2, 2004, Allan Lamkin.

(Continued)

*Primary Examiner*—Ngoc Vu
(74) *Attorney, Agent, or Firm*—Fitch, Even, Tabin & Flannery

(57) ABSTRACT

A method for providing enhanced content for play across multiple play platforms employs steps of delivering media content to a client device; delivering HTML content to a client device, the HTML content being accessible and usable by a plurality of client device platforms; activating a browser to access the HTML content, the browser being located on and compatible for use with the client device; activating firmware on the client device to access the media content; and incorporating the accessed HTML content with the accessed media content.

37 Claims, 8 Drawing Sheets

U.S. PATENT DOCUMENTS

| | | |
|---|---|---|
| 5,023,907 A | 6/1991 | Johnson et al. |
| 5,109,482 A | 4/1992 | Bohrman |
| 5,128,752 A | 7/1992 | Von Kohorn |
| 5,274,758 A | 12/1993 | Beitel et al. |
| 5,289,439 A | 2/1994 | Koulopoulos et al. |
| 5,305,195 A | 4/1994 | Murphy |
| 5,305,197 A | 4/1994 | Axler et al. |
| 5,347,508 A | 9/1994 | Montbriand et al. |
| 5,353,218 A | 10/1994 | De Lapa et al. |
| 5,400,402 A | 3/1995 | Garfinkle |
| 5,410,343 A | 4/1995 | Coddington et al. |
| 5,413,383 A | 5/1995 | Laurash et al. |
| 5,420,403 A | 5/1995 | Allum et al. |
| 5,457,746 A | 10/1995 | Dolphin |
| 5,483,658 A | 1/1996 | Grube et al. |
| 5,509,074 A | 4/1996 | Choudhury et al. |
| 5,530,686 A | 6/1996 | Schylander et al. |
| 5,550,577 A | 8/1996 | Verbiest et al. |
| 5,568,275 A | 10/1996 | Norton et al. |
| 5,619,733 A | 4/1997 | Noe et al. |
| 5,640,453 A | 6/1997 | Schuchman et al. |
| 5,640,560 A | 6/1997 | Smith |
| 5,642,171 A | 6/1997 | Baumgartner et al. |
| 5,651,064 A | 7/1997 | Newell |
| 5,659,792 A | 8/1997 | Walmsley |
| 5,673,195 A | 9/1997 | Schwartz et al. |
| 5,677,953 A | 10/1997 | Dolphin |
| 5,694,546 A | 12/1997 | Reisman |
| 5,696,898 A | 12/1997 | Baker et al. |
| 5,717,879 A | 2/1998 | Moran et al. |
| 5,729,687 A | 3/1998 | Rothrock et al. |
| 5,734,719 A | 3/1998 | Tsevdos et al. |
| 5,734,898 A | 3/1998 | He |
| 5,736,977 A | 4/1998 | Hughes |
| 5,751,672 A | 5/1998 | Yankowski |
| RE35,839 E | 7/1998 | Asai et al. |
| 5,790,753 A | 8/1998 | Krishnamoorthy |
| 5,801,685 A | 9/1998 | Miller et al. |
| 5,802,294 A | 9/1998 | Ludwig et al. |
| 5,804,810 A | 9/1998 | Woolley et al. |
| 5,805,442 A | 9/1998 | Crater et al. |
| 5,808,662 A | 9/1998 | Kinney et al. |
| 5,809,250 A | 9/1998 | Kisor |
| 5,809,471 A | 9/1998 | Brodsky |
| 5,812,661 A | 9/1998 | Akiyama et al. |
| 5,819,284 A | 10/1998 | Farber |
| 5,822,123 A | 10/1998 | Davis et al. |
| 5,822,291 A | 10/1998 | Brindze et al. |
| 5,825,876 A | 10/1998 | Peterson, Jr. |
| 5,850,218 A | 12/1998 | LaJolie et al. |
| 5,857,021 A | 1/1999 | Kataoka et al. |
| 5,860,068 A | 1/1999 | Cook |
| 5,869,819 A | 2/1999 | Knowles et al. |
| 5,872,747 A | 2/1999 | Johnson |
| 5,875,296 A | 2/1999 | Shi et al. |
| 5,878,020 A | 3/1999 | Takahashi |
| 5,878,233 A | 3/1999 | Schloss |
| 5,882,291 A | 3/1999 | Bradshaw et al. |
| 5,883,623 A | 3/1999 | Cseri |
| 5,887,143 A | 3/1999 | Saito et al. |
| 5,889,980 A | 3/1999 | Smith, Jr. |
| 5,892,825 A | 4/1999 | Mages et al. |
| 5,892,900 A | 4/1999 | Ginter et al. |
| 5,892,908 A | 4/1999 | Hughes et al. |
| 5,893,910 A | 4/1999 | Martineau et al. |
| 5,895,073 A | 4/1999 | Moore |
| 5,896,132 A | 4/1999 | Berstis et al. |
| 5,899,980 A | 5/1999 | Wilf et al. |
| 5,907,322 A | 5/1999 | Kelly et al. |
| 5,907,704 A | 5/1999 | Gudmundson et al. |
| 5,909,551 A * | 6/1999 | Tahara et al. ............... 709/231 |
| 5,913,210 A | 6/1999 | Call |
| 5,915,093 A | 6/1999 | Berlin et al. |
| 5,920,694 A | 7/1999 | Carleton et al. |
| 5,922,045 A | 7/1999 | Hanson |
| 5,924,013 A | 7/1999 | Guido et al. |
| 5,930,238 A | 7/1999 | Nguyen |
| 5,930,767 A | 7/1999 | Reber et al. |
| 5,931,906 A | 8/1999 | Fidelibus et al. |
| 5,933,497 A | 8/1999 | Beetcher et al. |
| 5,940,504 A | 8/1999 | Griswold |
| 5,943,304 A | 8/1999 | Kamada et al. |
| 5,950,173 A | 9/1999 | Perkowski |
| 5,956,482 A | 9/1999 | Agraharam et al. |
| 5,960,398 A | 9/1999 | Fuchigami et al. |
| 5,969,898 A | 10/1999 | Hansen et al. |
| 5,978,773 A | 11/1999 | Hudetz et al. |
| 5,986,690 A | 11/1999 | Hendricks |
| 5,987,454 A | 11/1999 | Hobbs |
| 5,987,525 A | 11/1999 | Roberts et al. |
| 5,991,374 A | 11/1999 | Hazenfield |
| 5,991,399 A | 11/1999 | Graunke et al. |
| 5,991,798 A * | 11/1999 | Ozaki et al. ................ 709/217 |
| 5,995,965 A | 11/1999 | Experton |
| 6,006,328 A | 12/1999 | Drake |
| 6,009,410 A | 12/1999 | LeMole et al. |
| 6,012,071 A | 1/2000 | Krishna et al. |
| 6,016,166 A | 1/2000 | Huang et al. |
| 6,018,768 A * | 1/2000 | Ullman et al. ............... 709/218 |
| 6,021,307 A | 2/2000 | Chan |
| 6,034,937 A | 3/2000 | Kumagai |
| 6,035,329 A | 3/2000 | Mages et al. |
| 6,044,403 A | 3/2000 | Gerszberg et al. |
| 6,047,292 A * | 4/2000 | Kelly et al. ................. 715/716 |
| 6,052,717 A | 4/2000 | Reynolds |
| 6,052,785 A | 4/2000 | Lin et al. |
| 6,055,314 A | 4/2000 | Spies et al. |
| 6,061,057 A | 5/2000 | Knowlton et al. |
| 6,064,979 A | 5/2000 | Perkowski |
| 6,073,124 A | 6/2000 | Krishnan et al. |
| 6,076,733 A | 6/2000 | Wilz, Sr. et al. |
| 6,078,348 A | 6/2000 | Klosterman et al. |
| 6,080,207 A | 6/2000 | Kroening et al. |
| 6,081,785 A | 6/2000 | Oshima et al. |
| 6,083,276 A | 7/2000 | Davidson et al. |
| 6,097,291 A | 8/2000 | Tsai et al. |
| 6,097,814 A | 8/2000 | Mochizuki |
| 6,101,180 A | 8/2000 | Donahue et al. |
| 6,101,534 A | 8/2000 | Rothschild |
| 6,108,002 A | 8/2000 | Ishizaki |
| 6,108,687 A | 8/2000 | Craig |
| 6,119,147 A | 9/2000 | Toomey et al. |
| 6,124,854 A | 9/2000 | Sartain et al. |
| 6,125,388 A | 9/2000 | Reisman |
| 6,128,649 A | 10/2000 | Smith et al. |
| 6,128,652 A | 10/2000 | Toh et al. |
| 6,134,533 A | 10/2000 | Shell |
| 6,134,593 A | 10/2000 | Alexander et al. |
| 6,138,150 A | 10/2000 | Nichols et al. |
| 6,141,010 A | 10/2000 | Hoyle |
| 6,145,006 A | 11/2000 | Vishlitsky et al. |
| 6,154,738 A | 11/2000 | Call |
| 6,154,773 A | 11/2000 | Roberts et al. |
| 6,154,844 A | 11/2000 | Touboul et al. |
| 6,157,953 A | 12/2000 | Chang |
| 6,161,132 A | 12/2000 | Roberts et al. |
| 6,175,842 B1 | 1/2001 | Kirk et al. |
| 6,175,872 B1 | 1/2001 | Neumann et al. |
| 6,182,222 B1 | 1/2001 | Oparaji |
| 6,184,877 B1 | 2/2001 | Dodson et al. |
| 6,189,032 B1 | 2/2001 | Susaki et al. |
| 6,192,340 B1 | 2/2001 | Abecassis |
| 6,195,693 B1 | 2/2001 | Berry et al. |
| 6,199,048 B1 | 3/2001 | Hudetz et al. |

| | | |
|---|---|---|
| 6,202,061 B1 | 3/2001 | Khosla et al. |
| 6,208,805 B1 | 3/2001 | Abecassis |
| 6,219,675 B1 | 4/2001 | Pal |
| 6,226,235 B1 | 5/2001 | Wehmeyer |
| 6,229,523 B1 | 5/2001 | Czako |
| 6,230,174 B1 | 5/2001 | Berger et al. |
| 6,230,324 B1 | 5/2001 | Tomita et al. |
| 6,233,618 B1 | 5/2001 | Shannon |
| 6,233,736 B1 | 5/2001 | Wolzien |
| 6,239,793 B1 | 5/2001 | Barnert et al. |
| 6,239,801 B1 | 5/2001 | Chiu et al. |
| 6,240,459 B1 | 5/2001 | Roberts et al. |
| 6,240,555 B1 | 5/2001 | Shoff et al. |
| 6,243,692 B1 | 6/2001 | Floyd et al. |
| 6,246,778 B1 | 6/2001 | Moore |
| 6,259,701 B1 | 7/2001 | Shur et al. |
| 6,263,501 B1 | 7/2001 | Schein et al. |
| 6,263,505 B1 * | 7/2001 | Walker et al. ............... 725/110 |
| 6,282,713 B1 | 8/2001 | Kitsukawa et al. |
| 6,289,165 B1 | 9/2001 | Abecassis |
| 6,298,482 B1 | 10/2001 | Seidman et al. |
| 6,301,661 B1 | 10/2001 | Shambroom |
| 6,308,005 B1 * | 10/2001 | Ando et al. .................... 386/95 |
| 6,321,252 B1 | 11/2001 | Bhola et al. |
| 6,331,865 B1 | 12/2001 | Sachs et al. |
| 6,341,375 B1 | 1/2002 | Watkins |
| 6,360,057 B1 * | 3/2002 | Tsumagari et al. ............ 386/95 |
| 6,374,402 B1 | 4/2002 | Schmeidler et al. |
| 6,381,404 B1 | 4/2002 | deCarmo |
| 6,388,714 B1 | 5/2002 | Schein et al. |
| 6,389,467 B1 | 5/2002 | Eyal |
| 6,389,473 B1 | 5/2002 | Carmel et al. |
| 6,405,203 B1 | 6/2002 | Collart |
| 6,415,438 B1 | 7/2002 | Blackketter et al. |
| 6,418,471 B1 | 7/2002 | Shelton et al. |
| 6,449,653 B2 | 9/2002 | Klemets et al. |
| 6,453,420 B1 | 9/2002 | Collart |
| 6,453,459 B1 | 9/2002 | Brodersen et al. |
| 6,460,086 B1 | 10/2002 | Swaminathan et al. |
| 6,460,180 B1 | 10/2002 | Park et al. |
| 6,462,754 B1 | 10/2002 | Chakraborty et al. |
| 6,463,468 B1 | 10/2002 | Buch et al. |
| 6,486,891 B1 | 11/2002 | Rice |
| 6,499,057 B1 | 12/2002 | Portuesi |
| 6,505,160 B1 | 1/2003 | Levy et al. |
| 6,505,169 B1 | 1/2003 | Bhagaveth et al. |
| 6,510,467 B1 | 1/2003 | Behfar et al. |
| 6,516,467 B1 | 2/2003 | Schindler et al. |
| 6,523,063 B1 | 2/2003 | Miller et al. |
| 6,526,580 B2 | 2/2003 | Shimomura |
| 6,529,949 B1 | 3/2003 | Getsin et al. |
| 6,535,909 B1 | 3/2003 | Rust |
| 6,543,053 B1 | 4/2003 | Li et al. |
| 6,564,255 B1 | 5/2003 | Mobini et al. |
| 6,567,980 B1 | 5/2003 | Jain et al. |
| 6,573,907 B1 | 6/2003 | Madrane |
| 6,580,870 B1 * | 6/2003 | Kanazawa et al. ............. 386/95 |
| 6,591,420 B1 | 7/2003 | McPherson et al. |
| 6,601,103 B1 | 7/2003 | Goldschmidt et al. |
| 6,609,253 B1 | 8/2003 | Swix et al. |
| 6,615,408 B1 | 9/2003 | Kaiser et al. |
| 6,625,656 B2 | 9/2003 | Goldhor et al. |
| 6,636,888 B1 | 10/2003 | Bookspan et al. |
| 6,640,337 B1 | 10/2003 | Lu |
| 6,659,861 B1 | 12/2003 | Faris et al. |
| 6,691,106 B1 | 2/2004 | Sathyanarayan |
| 6,691,126 B1 | 2/2004 | Syeda-Mahmood |
| 6,694,309 B2 | 2/2004 | Cho et al. |
| 6,698,020 B1 | 2/2004 | Zigmond et al. |
| 6,725,281 B1 | 4/2004 | Zintel et al. |
| 6,732,162 B1 | 5/2004 | Wood et al. |
| 6,741,790 B1 | 5/2004 | Burgess |
| 6,760,043 B2 | 7/2004 | Markel |
| 6,769,130 B1 | 7/2004 | Getsin |
| 6,771,290 B1 | 8/2004 | Hoyle |
| 6,803,950 B2 | 10/2004 | Miyamoto et al. |
| 6,865,746 B1 | 3/2005 | Herrington et al. |
| 6,868,225 B1 | 3/2005 | Brown et al. |
| 6,941,383 B1 | 9/2005 | Getsin et al. |
| 6,944,621 B1 | 9/2005 | Collart |
| 6,952,697 B1 | 10/2005 | Rothschild |
| 6,959,339 B1 | 10/2005 | Wu et al. |
| 7,024,497 B1 | 4/2006 | Maffezoni |
| 7,043,693 B2 | 5/2006 | Wenzel et al. |
| 7,062,777 B2 | 6/2006 | Alba et al. |
| 7,136,574 B2 | 11/2006 | Ando et al. |
| 7,165,071 B2 | 1/2007 | Fanning et al. |
| 7,165,098 B1 | 1/2007 | Boyer et al. |
| 7,168,012 B1 | 1/2007 | Clauss |
| 7,171,480 B2 | 1/2007 | Chatani |
| 7,178,106 B2 | 2/2007 | Lamkin |
| 2001/0001160 A1 | 5/2001 | Shoff |
| 2001/0005903 A1 | 6/2001 | Goldschmidt et al. |
| 2001/0056478 A1 | 12/2001 | Wheeler et al. |
| 2002/0026321 A1 | 2/2002 | Faris et al. |
| 2002/0056129 A1 | 5/2002 | Blackketter et al. |
| 2002/0057893 A1 | 5/2002 | Wood et al. |
| 2002/0059342 A1 * | 5/2002 | Gupta et al. ................. 707/512 |
| 2002/0073152 A1 | 6/2002 | Andrew et al. |
| 2002/0078144 A1 | 6/2002 | Lamkin et al. |
| 2002/0083377 A1 | 6/2002 | Clauss et al. |
| 2002/0103855 A1 | 8/2002 | Chatani |
| 2002/0143774 A1 | 10/2002 | Vandersluis |
| 2002/0184627 A1 | 12/2002 | Alba et al. |
| 2003/0005461 A1 | 1/2003 | Shinohara |
| 2003/0028892 A1 | 2/2003 | Gewickey et al. |
| 2003/0101232 A1 | 5/2003 | Ullman et al. |
| 2003/0204847 A1 | 10/2003 | Ellis et al. |
| 2004/0010510 A1 | 1/2004 | Hotti |
| 2004/0024889 A1 | 2/2004 | Getsin et al. |
| 2004/0040042 A1 | 2/2004 | Feinleib |
| 2004/0139077 A1 | 7/2004 | Banker |
| 2004/0220791 A1 | 11/2004 | Lamkin |
| 2004/0220926 A1 | 11/2004 | Lamkin |
| 2004/0244041 A1 | 12/2004 | Collart |
| 2004/0255236 A1 | 12/2004 | Getsin |
| 2005/0041150 A1 | 2/2005 | Gewickey |
| 2005/0044481 A1 | 2/2005 | Collart |
| 2005/0050208 A1 | 3/2005 | Chatani |
| 2005/0154682 A1 | 7/2005 | Taylor |
| 2005/0166232 A1 | 7/2005 | Lamkin |
| 2005/0182828 A1 | 8/2005 | Lamkin |
| 2005/0193322 A1 | 9/2005 | Lamkin |
| 2005/0198574 A1 | 9/2005 | Lamkin |
| 2005/0223013 A1 | 10/2005 | Jarman |
| 2005/0240588 A1 | 10/2005 | Siegel et al. |
| 2005/0251732 A1 | 11/2005 | Lamkin |
| 2005/0251749 A1 | 11/2005 | Lamkin |
| 2005/0265701 A1 | 12/2005 | Lamkin et al. |
| 2005/0278435 A1 | 12/2005 | Lamkin et al. |
| 2005/0278729 A1 | 12/2005 | Lamkin et al. |
| 2006/0004778 A1 | 1/2006 | Lamkin et al. |
| 2006/0041639 A1 | 2/2006 | Lamkin |
| 2006/0041640 A1 | 2/2006 | Lamkin |
| 2006/0107215 A1 | 5/2006 | Gewickey |
| 2006/0112336 A1 | 5/2006 | Gewickey |
| 2006/0117344 A1 | 6/2006 | Lamkin |
| 2006/0159109 A1 | 7/2006 | Lamkin |
| 2006/0161635 A1 | 7/2006 | Lamkin |
| 2006/0181965 A1 | 8/2006 | Collart |
| 2006/0182424 A1 | 8/2006 | Lamkin |
| 2006/0184538 A1 | 8/2006 | Randall |
| 2006/0193606 A1 | 8/2006 | Lamkin |
| 2006/0195600 A1 | 8/2006 | Getsin |

2007/0094583 A1  4/2007  Randall

FOREIGN PATENT DOCUMENTS

| | | |
|---|---|---|
| EP | 0 372 716 A2 | 6/1990 |
| EP | 0 762 422 A2 | 3/1997 |
| EP | 0 802 527 A1 | 10/1997 |
| EP | 0 809 244 A2 | 11/1997 |
| EP | 0 814 419 A2 | 12/1997 |
| EP | 0 849 734 A2 | 6/1998 |
| EP | 0 853 315 A2 | 7/1998 |
| EP | 0 809 244 A3 | 12/1998 |
| EP | 0 849 734 A3 | 3/1999 |
| EP | 0 853 315 A3 | 12/1999 |
| JP | 10063562 | 6/1998 |
| JP | 11039262 A | 12/1999 |
| JP | 2000236531 | 8/2000 |
| WO | WO 98/47080 | 10/1998 |
| WO | WO 98/58368 | 12/1998 |
| WO | WO 99/14678 | 3/1999 |
| WO | WO 99/51031 | 10/1999 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |

OTHER PUBLICATIONS

U.S. Appl. No. 10/860,350, filed Jun. 2, 2004, Allan Lamkin.
U.S. Appl. No. 10/877,644, filed Jun. 25, 2004, Todd R. Collart.
U.S. Appl. No. 10/880,272, filed Jun. 28, 2004, Evgeniy Getsin.
"Software Distribution by CD-ROM Linked with Network," IBM Technical Dislcosure Bulletin, vol. 38, No. 11, Nov. 1, 1995, pp. 111-112.
E Media Professional Reviews, by NSM Galaxy Jukebox and David Doering, http://www.emediapro.net.
Interactive Education: Transitioning CD-ROMs to the Web by Michael Mascha and Gary Seaman, Department of Anthropology, University of Southern California, Los Angeles, California, USA, Computer Networks and ISDN Systems 27 (1994) 267-272.
Active Video Watching Using Annotation, by Nuno Correia and Teresa Chambel, ACM Digital Library, International Multimedia Conference, Oct. 30-Nov. 5, 1999, in Orlando, Florida.
No Modem Needed: TV Signals Bring the Web to Your PC by Michael S. Lasky, Computing Storypage, CNN IDG.net, May 19, 1998.
All About DIVX, Where the Facts are Told and the Decision is Yours! Webmaster's Note Jan. 26, 1999, http://www.prodivx.com.
U.S. Appl. No. 09/649,215, filed Aug. 28, 2000, Allan Lamkin.
U.S. Appl. No. 09/476,190, filed Jan. 3, 2000, Todd R. Collart.
U.S. Appl. No. 09/488,345, filed Jan. 20, 2000, Todd R. Collart.
U.S. Appl. No. 09/488,337, filed Jan. 20, 2000, Evgeniy Getsin.
U.S. Appl. No. 09/488,613, filed Jan. 20, 2000, Evgeniy Getsin.
U.S. Appl. No. 09/488,155, filed Jan. 20, 2000, Evgeniy Getsin.
U.S. Appl. No. 09/489,597, filed Jan. 20, 2000, Evgeniy Getsin.
U.S. Appl. No. 09/489,600, filed Jan. 20, 2000, Evgeniy Getsin.
U.S. Appl. No. 09/488,614, filed Jan. 20, 2000, Evgeniy Getsin.
U.S. Appl. No. 09/489,596, filed Jan. 20, 2000, Todd R. Collart.
U.S. Appl. No. 09/489,601, filed Jan. 20, 2000, Evgeniy Getsin.
Advanced Television Enhancement Forum Specification (ATVEF), Comment Draft Version 1.0r1, 1-20 copy of printout from web site Http://www.atvef.com/atvef_spec/TVE-public.htm (Oct. 18, 1998).
MBONE Multicasting Tomorrow's Internet, Request for Comments (RFC) 1112 and 1458, Appendices A and B, Copyright 1996, 1998.
Abstract of "MBone Provides Audio and Video Across the Internet," M. R. Macedonia and D. P. Brutzman, IEEE Computer, vol. 27, No. 4, pp. 30-36 (Apr. 1994).
Family Tree Maker Announces 5.0 Patch, by Rick Roberts, The Global Gazette, http://globalgazette.net/gaztec/gaztec15.htm, posted Sep. 7, 1998, vol. II, No. 13.
"When Signed, Sealed, Delivered, It's Yours," by Precision Marketing, p. 30(1), Jul. 21, 1997.
http://www.spinware.net/portanet/portanet.html, printed on Jan. 8, 2003.
Abstract of Edgar Weippl's, "An Approach to Role-Based Access Control for Digital Content," 2001, IEEE, pp. 290-294.
Henry M. Gladney, "Safeguarding Digital Library Contents and Users: Document Access Control," Dlib Magazine, http://www.dlib.org/dlib/june97/ibm/06gladdney.html, Jun. 1997.
"All power to the Web; CD-ROM is dead—or is it?" by Richard Reisman, President, Teleshuttle Corporation, Jan. 1996 Teleshuttle white paper on Distributed Media, http://www.teleshuttle.com/tsdistrib.htm.
"CyberMedia Secures Major Licensing Agreement With Sony for Oil Change Software," http://www.cypbermedia.com/company/pr/sony.html, Nov. 26, 2001.
MarketScape's WebCD Pro Publisher, Ron Gustavson, Emedia Professional, Dec. 1997, http://www.emedialive.com/awards/award11.html.
"Hybrid CD-ROM/Online Titles Will Surge in 1996," DCD Business, Apr. 1996, http://www.tapediscbusiness.com/issues/1996/0496/apr_index.html.
PC Magazine, "Trends Online: Intel's Internet Plans: Hybrid Applications", Jul. 24, 1996.
"Internet tool triggers audio CDs," by Cate C. Corcoran, Jul. 24, 1995, http://www.access.ch/power/infoservices/MacWeek/MacWeek240795.html.
"MarketScape(R) WebCD(TM) 1.0 Bypasses Internet Bottlenecks," DialogWeb, Aug. 26, 1996.
"Microsoft Expands Benefits for Site Builder Network Members," Microsoft Press Releases, San Jose, CA, Oct. 29, 1996, http://www.spindia.com/trisoftdesign/Press/SBN/SBNtwkpr.htm.
"CD-ROM/Online Hybrids, The Missing Link?", by Richard R. Reisman, CD-ROM Professional, vol. 8, No. 4, Apr. 1995, http://www.teleshuttle.com/cdpart.htm.
Netstuff postings; Sep. 2-Sep. 6, 1996, Aug. 26-Aug. 30, 1996, Aug. 19-Aug. 23, 1996, Aug. 12-Aug. 16, 1996, edited by James Careless with files from the Newsbytes News Network, http://www.monitor.ca/monitor/issues/vol4iss1/netstuff.html.
"Oil Change software hunts down upgrades," by Bary Cooper, The Orlando Sentinel, Web-Posted Oct. 30, 1996, The Augusta Chronicle Online, http://www.augustachronicle.com/headlines/103196/oil_change.html.
Player 2.0 Product Description, Copyright 1995-2000, InterActual Technologies.
Resource Guide on Distributed Media: Local/CD-ROM/Online/Web, updated Nov. 25, 1996, Richard R. Reisman, President, Teleshuttle, http://www.teleshuttle.com/resource.
"Topic is Veritably Everywhere: CD-ROM, the Web, Intranets, etc.," Seybold Report on Desktop Publishing, vol. 10, No. 7, Copyright 1996 by Seybold Publications Inc.
"Spin Webs around a CD-ROM: The Next Generation of CD/Web Hybrids," Richard R. Reisman, President, Teleshuttle Corporation, Mass High Tech, Sep. 2, 1996, http://www.teleshuttle.com/nextgen.htm.
"Update Your Software While You Sleep," Edited by Paul M. Eng, Bits & Bytes, BusinessWeek, Updated Jun. 17, 1996, http://www.businessweek.com/1996/25/b3480140.htm.
"Verity smooths Net searches," by CNET News.com Staff, Tech News—CNET.com, Feb. 20, 1996.
"Video and Audio: Organization and Retrieval in the WWW", White Paper. (1996) http://vosaic.com/corp/papers/www5.html. Http://citeseer.nj.nec.com/chen96video.html.
"Web/CD-ROM hybrids; A working definition," site established Oct. 2, 1998, http://www.philb.com/webcd.htm.
Who's Who Hybrid Internet/CD-ROM Magazine/Catalog, Google cache Nov. 26, 2001, http://www.ecatcorp.com/alpha/mci.htm.
WebCD, Internet Posting, Roger Clarke, Dec. 1, 1996, http://www.anu.edu.au/people/Roger.Clarke/II/WebCD.html.
Re: WebCD, Internet Posting, Ron Ipsen, Dec. 1, 1996, http://www.anu.edu.au/mail-archives/link/link9612/0006.html.
Re: WebCD, Internet Postings, George Michaelson, Dec. 1, 1996, http://www.anu.edu.au/mail-archives/link/link9612/0003.html and Dec. 2, 1996, http://www.anu.edu.au/mail-archives/link/link9612/0011.html.

Re: WebCD, Internet Posting, Liddy Nevile, Dec. 2, 1996, http://www.anu.edu.au/mail-archives/link/link9612/0010.html.
Re: WebCD, Internet Posting, Rachel Polanskis, Dec. 2, 1996, http://www.anu.edu.au/mail-archives/link/link9612/0013.html.
www.techdirt.com/articles/20030516/1358202.shtml, May 16, 2003.
www.techdirt.com/articles/990616/1020235_F.shtml, Jun. 16, 2003.
"MultiSync: A Synchronization Model for Multimedia Systems," IEEE Journal On Selected Areas in Communications, vol. 14, No. 1, Jan. 1996, pp. 238-248.
"World-Wide Web: a distributed paadigm for global hetworking"; Heylighen, F., Proceeding SHARE Europe Spring Conference; pp. 355-368; Apr. 18, 1994.
"A Simplified and an Efficient Packet Level Internet Access Control Scheme"; Igbal, MS, et al.; ICCS/ISITA '92; Singapore; IEEE Publications; 1992; pp. 963-967.
"CDLink", Duguid, Brian; The Wire, Apr. 1996, available at http://www.hyperreal.org/~duguid/wirecdlk/html.
"CDLink: Multimedia Liner Notes to Complement Your Music Collection", Mirapaul, Matthew; N.Y. Times (online ed.); Jan. 25, 1996; available at http://is.gseis.ucla.edu/impact/w96/News/News3/0125mirapaul.html.
"Voyager CDLink Turns Aduio CDs into CD-ROMs"; Press Release, Voyager Co.; (Jul. 12, 1995), available at http://www.voyagerco.com from Jul. 12, 1995 to 1997.
"Net Surf", Wired Magazine, Issue 4.05 (May 1996), available at http://www.wired.com/wired/archive/4.05/net_surf.html.
"Voyager CDLink (VCD) Control Language Reference", available at http:web.archive.org/web/19970213172801/www.voyagerco.com/cdlink/about/vcd_ref/cmdref.html, originally available at http:www.voyagerco.com/cdlink/about/vcd_ref/cmdref.html on Aug. 8, 1995.
HyperLOCK Technologies at a Trade Show at the Jacob K. Javits Convention Center, New York, New York, taken Aug. 1, 1996.
"Hybrid 'Net: CD-ROMs & the Web working in tandem"; Rosebush, et al.; www.netscapeworld.com/netscapeworld/nw-08-1996/nw-08-hybridcd.html; published Aug. 15, 1996.
"Going Hybrid: The Online CD-ROM Connection"; Stansberry; NEWMEDIA, Jun. 1995, pp. 34-40.
"CD-ROM and Web browsers: HTML as the Lingua Franca", CD-ROM Professional, Aug. 1996, vol. 9, No. 8 at p. 26.
Standard ECMA-130, "Data interchange on read-only 120 mm optical data disks (CD-ROM)", 2nd Edition, Jun. 1996.
"Relative Uniform Resource Locators", Fielding, June 1995, available at http://www.w3.org/Addressing/rfc1808.txt.
"A Beginners Guide to URLs", available at http://archive.ncsa.uiuc.edu/demoweb/url-primer.html.
"Naming and Addressing: URIs, URLs, . . . " available at http://www.w3.org/Addressing.
Sastry, Chellury R. et al., "Webtour: A System to Record and Playback Dynamic Multimedia Annotations on Web Document Content" Proceedings of the seventh ACM international conference on Multimedia; Oct. 1999, pp. 175-178.
Nkane, et al., Development of combined HDD and recordable-DVD video recorder, consumer Electronics, 2002, ICCE, 2002 Digest of Technical Papers, International Conference on Jun. 18-20, 2002, pp. 264-265.
http://www.virtualtourguide.net, "Self-Guided Tour of Yellowstone", *Virtual Tour Guide, LLC*, first printed Jul. 3, 2007, 3 pages.
Office Action, "from U.S. Appl. No. 11/154,092 (86601) dated May 14, 2007 explaining JP2000236531".
Office Action from 09935756 dated Jul. 25, 2005 (71714).
Notice of Allowance from 10190307 dated Jun. 6, 2007 (73532).
Office Action from 10190307 dated Jan. 18, 2007 (73532).
Office Action from 10190307 dated Mar. 16, 2006 (73532).
Office Action from 10190307 dated Jul. 31, 2006 (73532).
Office Action from 10860351 dated Feb. 7, 2007(81173).
Notice of Allowance from 10346726 dated Jun. 6, 2007 (81049).
Office Action from 10860350 dated Apr. 3, 2007 (81296).
Advisory Action from 10880272 dated Jun. 2, 2006 (81336).
Office Action from 10880272 dated Jan. 24, 2007 (81336).
Office Action from 10880272 dated Apr. 4, 2006 (81336).
Office Action from 10880272 dated Jul. 10, 2007 (81336).
Office Action from 10880272 dated Dec. 29, 2005 (81336).
Office Action from 10957033 dated Jul. 19, 2007 (81376).
Office Action from 11060638 dated Jul. 5, 2007 (81405).
Office Action from 11154092 dated May 14, 2007 (86601).
http://www.sonic.com/, as printed in year 2007.
http://www.interactual.com/, as printed in year 2007.
PCT/US05/45521 International Search Report dated Jun. 5, 2007 (86673PC).
Office Action from 09489601 dated Jul. 9, 2004 (68624).
Office Action from 09489601 dated Oct. 20, 2004 (68624).
Office Action from 09489601 dated Nov. 15, 2005 (68624).
Advisory Action from 09489597 dated Jan. 17, 2006 (68625).
Office Action from 09489597 dated Apr. 5, 2005 (68625).
Office Action from 09489597 dated May 1, 2006 (68625).
Office Action from 09489597 dated Jul. 27, 2004 (68625).
Office Action from 09489597 dated Oct. 18, 2005 (68625).
Office Action from 09489597 dated Oct. 18, 2006 (68625).
Office Action from 09489597 dated Dec. 5, 2003 (68625).
Advisory Action from 09489596 dated Dec. 27, 2006 (68626).
Office Action from 09489596 dated Feb. 11, 2004 (68626).
Office Action from 09489596 dated Jun. 14, 2006 (68626).
Office Action from 09489596 dated Jun. 30, 2005 (68626).
Office Action from 09489596 dated Jul. 8, 2003 (68626).
Office Action from 09489596 dated Aug. 2, 2004 (68626).
Office Action from 09489596 dated Sep. 13, 2006 (68626).
Office Action from 09489596 dated Oct. 3, 2002 (68626).
Office Action from 09489596 dated Dec. 14, 2004 (68626).
Office Action from 09489596 dated Dec. 29, 2005 (68626).
Office Action from 09499247 dated Jul. 3, 2001 (68627).
Notice of Allowance from 09935756 dated Jun. 29, 2006 (71714).
Notice of Allowance from 09935756 dated Sep. 18, 2006 (71714).
Office Action from 09935756 dated Feb. 14, 2005 (71714).
Office Action from 09295856 dated Mar. 23, 2000 (68590).
Office Action from 09295856 dated Apr. 9, 2001 (68590).
Office Action from 09295856 dated Nov. 9, 2001 (68590).
Office Action from 09295856 dated Dec. 11, 2000 (68590).
Office Action from 09296202 dated Nov. 1, 2001 (68610).
Office Action from 09295964 dated Jun. 6, 2001 (68613).
Office Action from 09295964 dated Dec. 22, 2000 (68613).
Office Action from 09488143 dated May 22, 2001 (68619).
Office Action from 09488143 dated Dec. 14, 2000 (68619).
Advisory Action from 09649215 dated Nov. 19, 2003 (68570).
Interview Summary from 09649215 dated Feb. 13, 2004 (68570).
Interview Summary from 09649215 dated May 25, 2004 (68570).
Interview Summary from 09649215 dated Aug. 15, 2005 (68570).
Interview Summary from 09649215 dated Sep. 28, 2006 (68570).
Interview Summary from 09488337 dated Aug. 5, 2003 (68618).
Advisory Action from 09489600 dated Mar. 4, 2004 (68622).
Notice of Allowance from 09489600 dated May 31, 2005 (68622).
Interview Summary from 09489601 dated Dec. 29, 2004 (68624).
Interview Summary from 09489597 dated Sep. 8, 2004 (68625).
Interview Summary from 09489597 dated Oct. 18, 2005 (68625).
Interview Summary from 09489597 dated Oct. 18, 2006 (68625).
Notice of Allowance from 09935756 dated Oct. 2, 2006 (71714).
Advisory Action from 09489596 dated Sep. 21, 2005 (68626).
Interview Summary from 09488614 dated Jul. 27, 2005 (68623).
Office Action from 09488337 dated May 29, 2003 (68618).
Office Action from 09488337 dated Jun. 1, 2006 (68618).
Office Action from 09488337 dated Oct. 19, 2005 (68618).
Office Action from 09488337 dated Oct. 21, 2004 (68618).
Office Action from 09488337 dated Oct. 24, 2003 (68618).
Notice of Allowance from 09489600 dated Aug. 2, 2006 (68620).
Notice of Allowance from 09489600 dated Sep. 7, 2006 (68620).
Notice of Allowance from 09489600 dated Oct. 24, 2006 (68620).
Office Action from 09489600 dated Mar. 2, 2005 (68620).
Office Action from 09489600 dated Jun. 17, 2003 (68620).
Office Action from 09489600 dated Jul. 29, 2004 (68620).
Office Action from 09489600 dated Nov. 14, 2003 (68620).
Office Action from 09489600 dated Dec. 3, 2002 (68620).
Advisory Action from 09488155 dated Apr. 15, 2004 (68621).
Notice of Allowance from 09488155 dated Oct. 13, 2004 (68621).

Office Action from 09488155 dated Jan. 21, 2004 (68621).
Office Action from 09488155 dated Jul. 2, 2003 (68621).
Office Action from 09488155 dated Jul. 3, 2001 (68621).
Advisory Action from 09488614 dated May 20, 2005 (68623).
Office Action from 09488614 dated Jan. 12, 2005 (68623).
Office Action from 09488614 dated Mar. 15, 2006 (68623).
Office Action from 09488614 dated Mar. 29, 2004 (68623).
Office Action from 09488614 dated Oct. 5, 2006 (68623).
Advisory Action from 09489601 dated Feb. 8, 2005 (68624).
Office Action from 09489601 dated Jan. 30, 2004 (68624).
Office Action from 09489601 dated Apr. 13, 2007 (68624).
Office Action from 09489601 dated Apr. 27, 2006 (68624).
Office Action from 09489601 dated Jun. 2, 2005 (68624).
Advisory Action from 09476190 dated Jun. 17, 2002 (68616).
Interview Summary from 09476190 dated Dec. 9, 2003 (68616).
Office Action from 09476190 dated Feb. 17, 2005 (68616).
Office Action from 09476190 dated Mar. 22, 2004 (68616).
Notice of Allowance from 09488613 dated Jan. 13, 2004 (68620).
Office Action from 09488613 dated Jun. 5, 2003 (68620).
Office Action from 09488613 dated Jun. 17, 2004 (68620).
Notice of Allowance from 09499247 dated Oct. 1, 2002 (68627).
Office Action from 09499247 dated Apr. 26, 2002 (68627).
Office Action from 09649215 dated Feb. 13, 2004 (68570).
Office Action from 09649215 dated Mar. 28, 2006 (68507).
Office Action from 09649215 dated Apr. 4, 2003 (68570).
Office Action from 09649215 dated Apr. 21, 2005 (68570).
Office Action from 09649215 dated Aug. 16, 2004 (68570).
Office Action from 09649215 dated Aug. 26, 2003 (68570).
Office Action from 09649215 dated Sep. 28, 2006 (68570).
Office Action from 09649215 dated Oct. 17, 2005 (68570).
Notice of Allowance from 09476190 dated Feb. 25, 2004 (68616).
Office Action from 09476190 dated Mar. 25, 2003 (68616).
Office Action from 09476190 dated Apr. 10, 2002 (68616).
Office Action from 09476190 dated Aug. 27, 2001 (68616).
Office Action from 09476190 dated Sep. 15, 2003 (68616).
Office Action from 09476190 dated Oct. 1, 2002 (68616).
Office Action from 09488345 dated Mar. 29, 2004 (68617).
Advisory Action from 09488337 dated Jul. 29, 2004 (68618).
Advisory Action from 09488337 dated Aug. 21, 2003 (68618).
Advisory Action from 09488337 dated Aug. 24, 2006 (68618).
Examiner Answer to Appeal Brief from 09488337 dated Apr. 18, 2007 (68618).
Office Action from 09488337 dated Jan. 15, 2003 (68618).
Office Action from 09488337 dated Feb. 14, 2006 (68618).
Office Action from 09488337 dated Mar. 4, 2004 (68618).
Office Action from 09488337 dated May 6, 2005 (68618).
Adams et al. "Distributed Search Teams: Meeting Asynchronously in Virtual Spate" FX Palo Alto Laboratory, Inc. JCMC Jun. 1999.
Manohar et al. "Replay by Re-execution: a Paradigm for Asynchronous Collaboration via Record and Replay of Interactive Multimedia Sessions" SIGOIS Bulletin, Dec. 1994.
Minneman et al. "A Confederation of Tools for Capturing and Accessing Collaborative Activity" ACM Multimedia 95—Electronic Proceedings Nov. 1995.

* cited by examiner

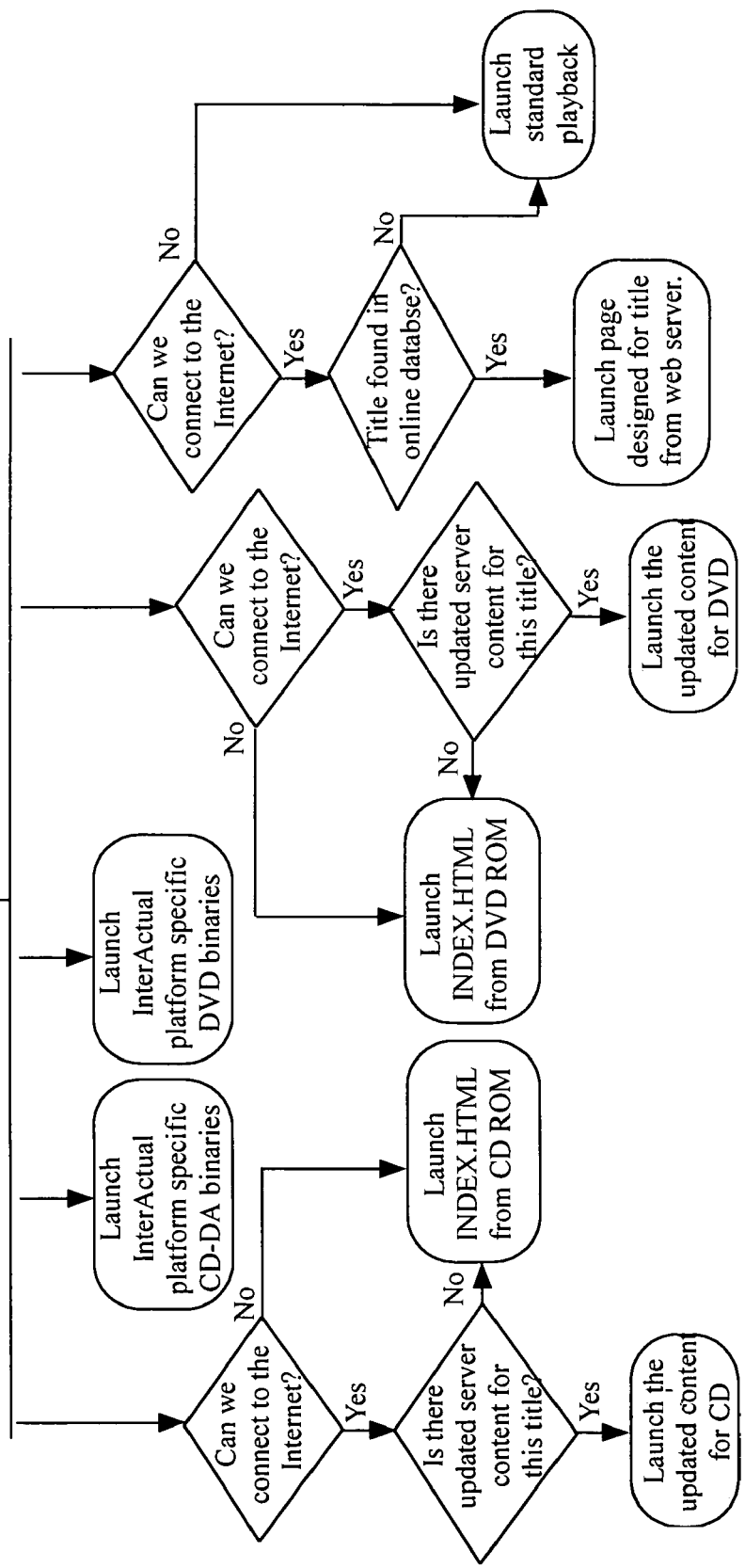

SYSTEM, METHOD AND ARTICLE OF MANUFACTURE FOR A COMMON CROSS PLATFORM FRAMEWORK FOR DEVELOPMENT OF DVD-VIDEO CONTENT INTEGRATED WITH ROM CONTENT

This patent document claims priority to Provisional Patent Application No. 60/216,822 under 35 U.S.C. § 119 (e).

BACKGROUND OF THE INVENTION

The present invention relates to enhancement of multimedia content and more particularly to a system, method and apparatus for enhancing multimedia content with supplemental content.

Multimedia computer systems have become increasingly popular over the last several years due to their versatility and their interactive presentation style. A multimedia computer system can be defined as a computer system having a combination of video and audio outputs for presentation of audio-visual displays. A modern multimedia computer system typically includes one or more storage devices such as an optical drive, a CD-ROM, DVD (DVD-Video or DVD Audio etc), Laser Disc, Video Disc or Audio Disc, or a hard drive. Audio and video data are typically stored on one or more of these mass storage devices. In some file formats the audio and video are interleaved together in a single file, while in other formats the audio and video data are stored in different files, many times on different storage media. Audio and video data for a multimedia display may also be stored in separate computer systems that are networked together. In this instance, the computer system presenting the multimedia display would receive a portion of the necessary data from the other computer system via the network cabling.

Multimedia computer systems have become increasingly popular over the last several years due to their versatility and their interactive presentation style. A multimedia computer system can be defined as a computer system having a combination of video and audio outputs for presentation of audio-visual displays. A modern multimedia computer system typically includes one or more storage devices such as an optical drive, a CD-ROM, a hard drive, a videodisc, or an audio disc, and audio and video data are typically stored on one or more of these mass storage devices. In some file formats the audio and video are interleaved together in a single file, while in other formats the audio and video data are stored in different files, many times on different storage media. Audio and video data for a multimedia display may also be stored in separate computer systems that are networked together. In this instance, the computer system presenting the multimedia display would receive a portion of the necessary data from the other computer system via the network cabling.

Graphic images used in Windows multimedia applications can be created in either of two ways, these being bit-mapped images and vector-based images. Bit-mapped images comprise a plurality of picture elements (pixels) and are created by assigning a color to each pixel inside the image boundary. Most bit-mapped color images require one byte per pixel for storage, so large bit-mapped images create correspondingly large files. For example, a full-screen, 256-color image in 640-by-480-pixel VGA mode requires 307,200 bytes of storage, if the data is not compressed. Vector-based images are created by defining the end points (corners), thickness, color, pattern and curvature of lines and solid objects within an image. Thus, a vector-based image includes a definition that consists of a numerical representation of the coordinates of the object, referenced to a corner of the image.

Bit-mapped images are the most prevalent type of image storage format, and the most common bit-mapped-image file formats are as follows. A file format referred to as BMP is used for Windows bit-map files in 1-, 2-, 4-, 8-, and 24-bit color depths. BMP files contain a bit-map header that defines the size of the image, the number of color planes, the type of compression used (if any), and the palette used. The Windows DIB (device-independent bit-map) format is a variant of the BMP format that includes a color table defining the RGB (red green blue) values of the colors used. Other types of bit-map formats include the TIF (tagged image format file), the PCX (Zsoft Personal Computer Paintbrush Bitmap) file format, the GIF (graphics interchange file) format, and the TGA (Texas Instruments Graphic Architecture) file format.

The standard Windows format for bit-mapped images is a 256-color device-independent bit map (DIB) with a BMP (the Windows bit-mapped file format) or sometimes a DIB extension. The standard Windows format for vector-based images is referred to as WMF (Windows meta file).

Full-motion video implies that video images shown on the computer's screen simulate those of a television set with identical (30 frames-per-second) frame rates, and that these images are accompanied by high-quality stereo sound. A large amount of storage is required for high-resolution color images, not to mention a full-motion video sequence. For example, a single frame of NTSC video at 640-by-400-pixel resolution with 16-bit color requires 512K of data per frame. At 30 flames per second, over 15 Megabytes of data storage are required for each second of full motion video. Due to the large amount of storage required for full motion video, various types of video compression algorithms are used to reduce the amount of necessary storage. Video compression can be performed either in real-time, i.e., on the fly during video capture, or on the stored video file after the video data has been captured and stored on the media. In addition, different video compression methods exist for still graphic images and for full-motion video.

Examples of video data compression for still graphic images are RLE (run-length encoding) and JPEG (Joint Photographic Experts Group) compression. RLE is the standard compression method for Windows BMP and DIB files. The RLE compression method operates by testing for duplicated pixels in a single line of the bit map and stores the number of consecutive duplicate pixels rather than the data for the pixel itself. JPEG compression is a group of related standards that provide either lossless (no image quality degradation) or lossy (imperceptible to severe degradation) compression types. Although JPEG compression was designed for the compression of still images rather than video, several manufacturers supply JPEG compression adapter cards for motion video applications.

In contrast to compression algorithms for still images, most video compression algorithms are designed to compress full motion video. Video compression algorithms for motion video generally use a concept referred to as interframe compression, which involves storing only the differences between successive frames in the data file. Interframe compression begins by digitizing the entire image of a key frame. Successive frames are compared with the key frame, and only the differences between the digitized data from the key frame and from the successive frames are stored. Periodically, such as when new scenes are displayed, new key frames are digitized and stored, and subsequent comparisons begin from this new reference point. It is noted that interframe compression ratios are content-dependent, i.e., if the video clip being compressed includes many abrupt scene transitions from one image to another, the compression is less efficient. Examples of video compression which use an interframe compression technique are MPEG, DVI and Indeo, among others.

MPEG (Moving Pictures Experts Group) compression is a set of methods for compression and decompression of full motion video images that uses the interframe compression technique described above. The MPEG standard requires that sound be recorded simultaneously with the video data, and the video and audio data are interleaved in a single file to attempt to maintain the video and audio synchronized during playback. The audio data is typically compressed as well, and the MPEG standard specifies an audio compression method referred to as ADPCM (Adaptive Differential Pulse Code Modulation) for audio data.

A standard referred to as Digital Video Interactive (DVI) format developed by Intel Corporation is a compression and storage format for full-motion video and high-fidelity audio data. The DVI standard uses interframe compression techniques similar to that of the MPEG standard and uses ADPCM compression for audio data. The compression method used in DVI is referred to as RTV 2.0 (real time video), and this compression method is incorporated into Intel's AVK (audio/video kernel) software for its DVI product line. IBM has adopted DVI as the standard for displaying video for its Ultimedia product line. The DVI file format is based on the Intel i750 chipset and is supported through the Media Control Interface (MCI) for Windows. Microsoft and Intel jointly announced the creation of the DV MCI (digital video media control interface) command set for Windows 3.1 in 1992.

The Microsoft Audio Video Interleaved (AVI) format is a special compressed file structure format designed to enable video images and synchronized sound stored on CD-ROMs to be played on PCs with standard VGA displays and audio adapter cards. The AVI compression method uses an interframe method, i.e., the differences between successive frames are stored in a manner similar to the compression methods used in DVI and MPEG. The AVI format uses symmetrical software compression-decompression techniques, i.e., both compression and decompression are performed in real time. Thus AVI files can be created by recording video images and sound in AVI format from a VCR or television broadcast in real time, if enough free hard disk space is available.

As discussed above, such audio and video content is often stored on media such as CD-ROM or digital video disc (DVD). However, once a vendor has delivered such content to a customer, the vendor loses any practical control over the product. Even if the product is delivered under license rather than out right sale, it has traditionally been difficult to prevent a customer from copying the content or providing the content to any number of friends so that they might illegally copy the content.

The now familiar compact disk preserves information as a series of microscopic pits and smooth areas, oriented in concentric circular or helical tracks, on the otherwise smooth, planar surface of an annular disk. Recorded information is read from a compact disk by directing a focused laser beam along the recorded tracks, and detecting variations in the intensity of the laser beam along the recorded tracks, and detecting variations in the intensity of the laser beam as it encounters the microscopic pits and smooth areas on the disk. The coherence and relatively short wavelength of laser radiation enables large volumes of information to be written onto very small spaces of a recording medium.

Compact disks were first introduced in the music recording industry in 1982, and now account for 43% of all recorded music sales. In the United States alone, over three hundred million compact disks are sold annually, with a retail value of over three billion dollars, according to the Recording Industry Association of America. The most prevalent format for recording multimedia events onto such disks is Digital Video or Versatile Disk (DVD). The DVD is a read only format for recording a relatively large amount of high quality data. When delivered to a user, the disk is input into a CD-ROM player on a client device such as a computer. Software on the client device allows the DVD formatted data to be read.

Once the DVD disk has been manufactured the content is essentially fixed. The content that the user can access from the disk is limited to the content provided when the disk was manufactured. In order to update the information, a new disk must be created and delivered to the user. This is an expensive and inconvenient solution.

Thus there remains a need for a system for easily and efficiently updating content provided on a DVD-disk. Such a system would preferably allow update information to be delivered via a network such as the Internet. In addition, such a system would take advantage of software capabilities already present on the client device, and would importantly be able to function on the many different possible platforms of client devices, such as for example Macintosh, PC or a set top box.

Disc technologies that are re-writeable like a CD-RW or technologies that allow multiple sessions can be used for adding additional or updated content directly to the disc. Thus for multi-session discs, where the first session of the disc is write-once and additional sessions on the disc can be either write-one, or rewriteable, additional or updated content can be added to these additional sessions of the disc. This includes such technologies as the "Orange Book" specification for CD-ROM, including CD-PROM and Multimedia discs such a Dataplay.

Flash memory based and other similar memory technologies can be used for storing multimedia and additional or updated content as well. This includes IBM technology that uses a USB interface to coupled a personal computer to a storage device such as a "keychain" memory device.

The present invention advantageously addresses the above and other needs.

SUMMARY OF THE INVENTION

The present invention advantageously addresses the needs above as well as other needs by providing the enhancement of multimedia content and more particularly to providing a system, method and apparatus for enhancing multimedia content with supplemental content.

In one embodiment, the invention can be characterized as a method for providing enhanced content for play across multiple play platforms. The method employs steps of delivering media content to a client device; delivering HTML content to a client device, the HTML content being accessible and usable by a plurality of client device platforms; activating a browser to access the HTML content, the browser being located on and compatible for use with the client device; activating firmware on the client device to access the media content; and incorporating the accessed HTML content with the accessed media content.

In another embodiment, the invention can be characterized as a method for enhancing multimedia content. The method employs steps of providing a recording medium; recording content onto the recording medium; integrating HTML content with the recorded content; accessing the recorded content and the HTML content; and playing a multimedia event based on the accessed content.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
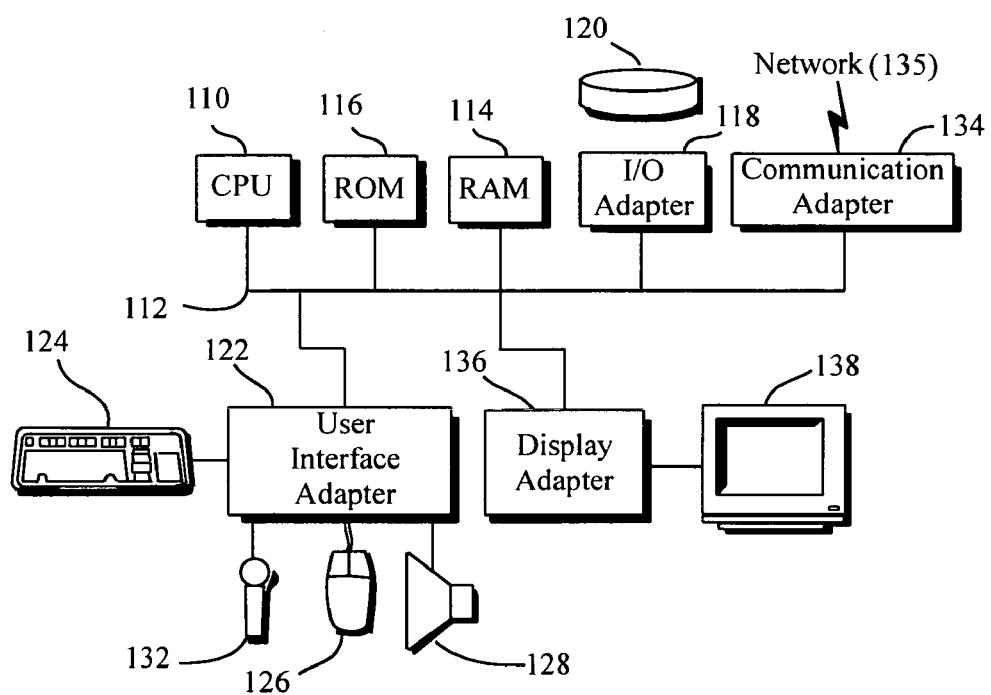
FIG. 1 is a schematic diagram of a hardware implementation of one embodiment of the present invention.

FIG. 1 illustrates a system for providing enhanced DVD content for play across multiple user platforms. Both DVD-Video content and HTML content are recorded on DVD discs and provided to a user. The HTML content includes various directories that allow it to be accessed by multiple platforms of user devices. Once inserted into a user device, browser software on the user device accesses the HTML content and supplies supplemental update information to enhance the play experience provided by the DVD-Video content. The supplemental update information can be either retrieved via a network such as the Internet or can be provided directly from the HTML data itself stored on the DVD disc.

In various embodiments, the client devices may take the form of computers, televisions, stereos, home appliances, or any other types of devices. In one embodiment, the client apparatuses and the host computer each include a computer such as an IBM compatible computer, Apple Macintosh computer or UNIX based workstation.

A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 (i.e. DVD playback device) to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT/2000 or Windows 95/98/ME Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, HTML and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

A preferred embodiment of the invention utilizes Hypertext Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

In accordance with one embodiment, a cross-platform DVD specification defined, which is called InterActual Technologies Cross Platform, hereafter referred to by the name ITX. By following the ITX specification, DVD authors can create HTML-enhanced DVD-Video/Audio content that can play reliably across multiple playback platforms, ranging from computers (such as Windows and Macintosh) to Internet-connected set-top devices (such as the Sony Playstation II and Nuon-enhanced consumer DVD players). The general requirements for enhanced DVD authoring and the requirements for the playback devices, both hardware and software are described herein.

The ITX enables DVD-Video/Audio (hereafter referred to only as DVD-Video) content developers to create products that seamlessly combine the Internet and/or other DVD-ROM capabilities with DVD-Video to create a richer, more interactive, and personalized entertainment experience for their customers. All this is accomplished without the need for content developers to create special content for each unique playback platform, and without the need of becoming an expert programmer on Windows, Macintosh, and other platforms. Additionally the present invention allows for customized content and functions tailored for specific platform(s).

Internet connectivity is not a requirement for the use of ITX. A stand-alone system with HTML browser functionality is all that is required. In addition, CD-DA (standard music CDs) can also be enhanced by use of ITX.

The following terms are defined as follows:

| Term | Description |
| --- | --- |
| BCA | Burst Cutting Area. Area near inner ring on a DVD disc where custom data can be imprinted |
| ATVEF | Advanced Television Enhancement Forum (spec allows combining HTML and TV programming) |
| PIP | Picture in Picture |
| DVD-Video | A disc authored in accordance with the DVD-Video specification. Any place where the term DVD-Video is used it also applies to DVD-Audio, unless specifically excluded. |
| UOP | User Operations (as defined DVD-Video and DVD-Audio specifications) |

The following documents are incorporated by reference:

| | |
| --- | --- |
| 1. | HTML Cross Platform Authoring Guidelines |
| 2. | ISO-9660 |
| 3. | ATVEF Specification (http://www.atvef.com) |
| 4. | DVD-Video (Book 3) and DVD-Audio (Book 4) specifications |

The ITX specification provides a common framework whereby content developers, browser providers, and hardware manufacturers can successfully create and playback Internet-enhanced DVD and CD products.

This description of the embodiments is divided into three major sections, targeting three different audiences:

Content Development Requirements: Addresses issues specific to DVD authors and content creators. The target audience includes DVD authoring facilities, web designers, and graphics and creative production facilities. This section outlines the integration of DVD-Video with Web Pages, Programming Interfacing, and other cross-platform DVD-Video and DVD-ROM authoring considerations.

Browser Requirements: Addresses issues specific to browser implementation. The target audience includes establishments such as: PlanetWeb, Spyglass, Liberate, and VM Labs (with a custom implementation of the Spyglass browser). This section outlines basic browser requirements to support ITX titles and integration of a DVD-Video programming interface.

Platform/Hardware Requirements: Addresses issues specific to DVD-Video hardware platforms. The target audience includes specialized chip manufacturers, consumer DVD-Video player, game system manufacturers (Sony Playstation, Nintendo, Sega), and any others who might incorporate web connectivity into DVD player products. This section outlines display requirements, browser interfaces, and other hardware-specific requirements.

Figure 2:
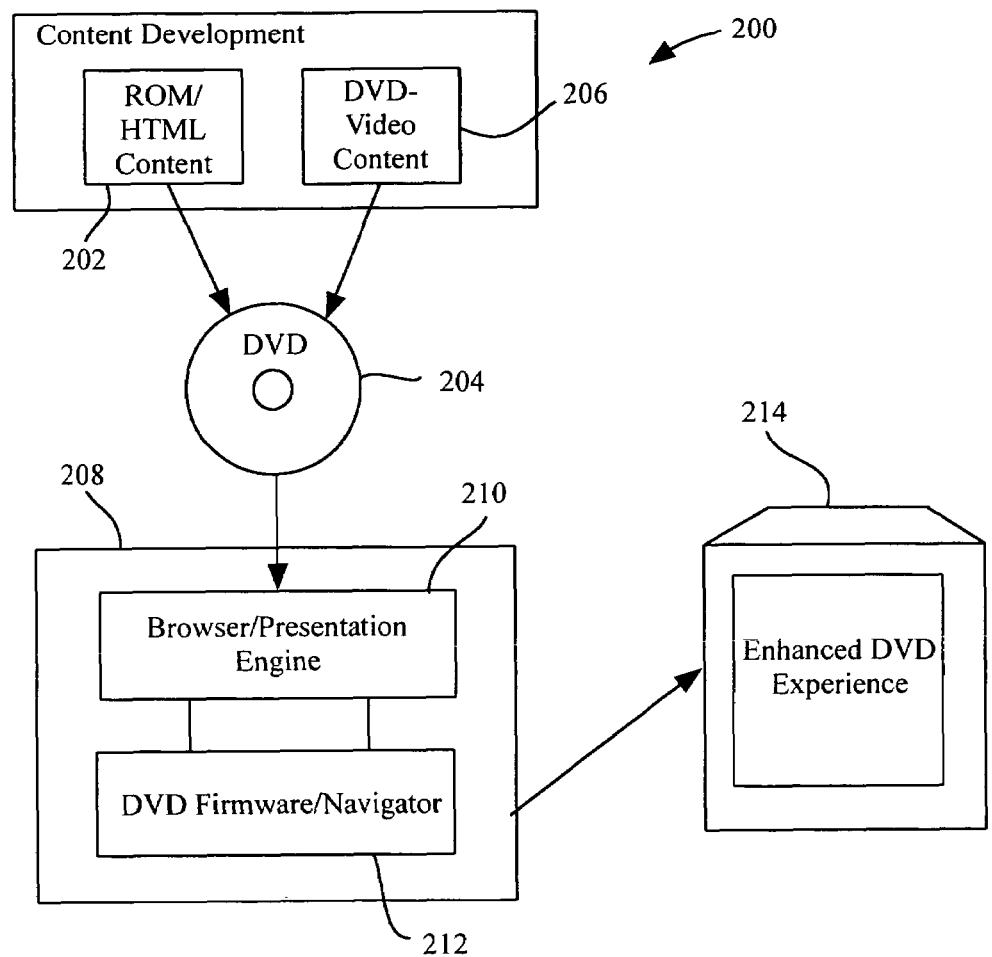
FIG. 2 is a schematic diagram of a system for enhancing a DVD multimedia experience.

With reference to FIG. 2, in an embodiment, a system 200 is provided for enhancing an internet play experience. ROM/HTIM content 202 is recorded onto a DVD disc 204. Additionally DVD-Video content 206 is also recorded onto the DVD disc. The disc 104 is inserted into a client device 208 that contains Browser/Presentation software 210 thereon. The client device hardware also includes a DVD Firmware/Navigator 212 that reads the DVD-Video content. In addition, the client device 208 includes a Browser/Presentation Engine software 110, which reads the ROM/HTML Content. The Browser/Presentation Engine can be for example Netscape Navigator or some other engine commonly available on personal computers. After reading the ROM/HTML content, the browser software 110 searches the Internet to find supplemental information related to the DVD content and incorporates the supplemental information into the DVD content 202, 206 to create an Internet Enhanced DVD Experience 214.

To better understand the purpose and goals of ITX three possible usage scenarios are described, each with an increasing level of complexity.

DVD-Video disc with movie script provided:

A movie is authored with the entire screenplay provided on the DVD disc in HTML format. Clicking on any scene visually represented in the HTML immediately links the user to that scene within the DVD-Video. Besides being a finer granularity than the normal chapter navigation provided on DVD-Video, the HTML-based script could contain other media (pictures, audio) and/or live web links for other information (stored either on the DVD disk, or accessible through the Internet). Further, the text of the screenplay in HTML could automatically "scroll" with the DVD-Video to give the appearance of being synchronized with the DVD-Video. Although many of these types of features (minus live web links and synchronized scrolling) could be authored in DVD-Video, HTML authoring is much more efficient, immediate and widely known.

More complex menus:

A DVD-Video is shipped with a simple HTML page that does little except start a movie. However, the HTML page also uses the Internet and checks to see if that movie has any web site updates. If it does, then the HTML page launches a new movie menu that is downloaded from the web. This new menu might have e-commerce opportunities (buy gifts based on the movie; buy tickets for the sequel to the DVD, etc.). Because the new movie menu is not on the DVD-Video, but rather is on a server accessible via the internet, the window of time during which the choices on the new movie menu is available can be decided by the studio long after the DVD-Video has shipped. The new movie menu may have new links to an actor's web site, which can be particularly advantageous if, for example, the actor has become a star since the movie was made, and therefore wasn't given star treatment in the original DVD-Video. The new movie menu may just be a more convenient way to navigate the disc to a finer granularity than the chapters provided. Advantageously, in accordance with the present embodiment, the DVD can have new movie menus stored on a server accessible through the internet, and that can be changed over time. If the DVD-Video is played without ITX, the DVD-Video operates in a conventional manner.

Live webcast with the director or stars in live chat:

A DVD-Video movie is shipped with an HTML page that links the user to an ITX web site. This site (and studio advertising) notifies the user of the date/time of a "live chat" with, for example, the movie's director, who will discuss the making of the movie. Near the event starting time, the user connects to the web site with the DVD-Video in his/her DVD player. At the start time, the director begins sending voice (such as streaming audio, e.g., Real Audio) over the Internet. The director controls the DVD player of the user, as well as other DVD players, by sending play, pause, fast-forward, and rewind commands, etc. (Latecomers are automatically synchronized). User (if they have, for example, a browser with a keyboard) can enter questions. The director can choose which questions to answer and control every DVD player to an appropriate scene in the movie and discuss the scene. Through the use of bitmap overlay layers and drawing tools, the director can pause the video and draw on the screen (like a football play) to better explain the details involved in creating a certain scene, for example. As the director moves from one question to another the video can use transitions and special effects to make the presentation more professional and entertaining.

In order to support the above-described functionality, the present embodiment is as follows. An ITX disk can contain DVD Video and ITX-compatible ROM data, DVD-Audio and ITX-compatible ROM data, CD-Audio and ITX-compatible ROM data, or the like. The ITX compatible ROM data can be any digital file type including HTML and graphics, including for example, HTML graphics, subject to file system limitations described below. There is no theoretical limit to the amount of ITX compatible ROM data that can be placed on a DVD disk, except for physical constraints of the DVD disk (or in an alternative embodiment CD-disk).

An ITX-compatible disk adheres to rules regarding capability, detection, file system, directory structure, and content location, each of which is described in further detail herein. As multi-platform support is a goal of the present embodiment, an ITX disk provides for both platform-specific behavior and general-purpose behavior. Platform-specific behavior can be accomplished using the ITX-API described above, by either placing platform-specific binaries on the DVD disk in predefined directories, described herein, or by authoring general purpose HTML content that uses, for example, ECMAScript or JavaScript and the ITX API to detect specific platforms and to "serve" web pages specifically designed for a particular platform, i.e., particular type of device. General purpose content can be created for playback on multiple platforms using HTML content and the ITX API. Both approaches can be combined so that platform-specific behavior can be employed with certain devices, while other devices, such as devices developed after release of the DVD disk, can be supported with general-purpose behavior.

For personal computers, such as personal computers operating under Microsoft Windows, ITX content can be viewed through a proprietary browser client per the ITX content viewed through the proprietary browser client can be the same content that is displayed on, for example, a browser-enhanced consumer electronics system, such as a set top box, a game console, or an internet-connected DVD player or the like.

The device must provide a capability to determine the type of media that has been inserted into the device. Specifically, the device must be able to determine whether the media is a DVD disk or some form of CD disk. For CD-DA, there may or may not be a file structure formatted on the CD-DA disk, such as described herein and therefore the CD-DA disk table of contents must be read per the "redbook" specification.

An ITX-compatible DVD or CD is detected by checking for the existence of a file named index.htm in a directory named common. The ITX-API version information can be found in a mediated area in the index.htm file, which is an HTML file.

The index.htm file provides JavaScript that detects the particular type of device into which the DVD disk has been inserted, and the device is "navigator," and provides general framework for interactive playback. For a disk not authored in accordance with the ITX content, a content homepage is employed, i.e., file named default.htm is employed. The default.htm file may be stored in memory on the device.

CONTENT DEVELOPMENT REQUIREMENTS

This section describes the requirements for content developers, DVD authors, and creative houses. This section outlines how DVD-Video can be integrated with ROM content for playback across multiple hardware platforms and multiple browsers. For more information regarding cross-platform HTML development (independent of integration with DVD-Video), refer to the InterActual™ HTML Cross Platform Authoring Guidelines document. This reference document outlines platform/browser detection, use of JavaScript files (.js files) and other HTML authoring techniques.

DVD/ROM Authoring Considerations:

ITX Directory and File Naming Conventions (mandatory compliance)

When making an ITX disk, DVD video zone files must be placed physically at the beginning of the ITX disk, contiguously, in the order specified by the DVD-Video specification, likewise, DVD-Audio zone files must follow the DVD-Video files in contiguous order.

The DVD specifications for DVD-Video and DVD-Audio require that each disc contain specific directories and files. For example, the DVD-Video files are contained in a directory (or folder) with the name VIDEO_TS; DVD-Audio files in the AUDIO_TS directory. The VIDEO_TS and AUDIO_TS directories should be the first entries in the directory descriptor (the true order of the directory and file entries is usually hidden, since most operating systems list them in, for example, alphabetical order). There is no such requirement for "DVD-ROM" content, and, thus, developers can arrange other files on a disc in any desired manner. It is best to place ROM-zone files in subdirectories versus the root directory. The placement of files on a dual-layered disk (DVD-9, DVD-14, or DVD-18) is generally independent of layer details. DVD-Video and DVD-Audio files must begin on layer zero. ROM-zone files are beginning after the DVD-Video (or DVD-Audio) files and can cross layer boundaries, if needed. In order to prevent problems that can arise from this open aspect of the specifications, ITX provides a convention for ordering and naming files.

Files stored for use with ITX can be in any DVD disc directory. However, there must be a method that allows the platform-specific browser and/or playback engine to identify the initial starting HTML file in the case were there is no executable file. Also, in order to simplify support, it is strongly suggested that the full convention described below be followed on all ITX-authored discs.

ITX Naming Standard:

Each DVD-Video authoring system and tool set supports different naming capabilities; such as ISO-9660, ISO-9660 with Joliet extensions, Macintosh file names, support for Macintosh resources, hybrid discs, etc. Some authoring tools go even further by forcing a certain character case (e.g., the Toshiba authoring system forces all characters to upper-case). These issues must be taken into account as part of the development process since some playback platforms may operate differently depending on the physical layout and file structure on the DVD. As a specific example, Windows and Macintosh operating systems are case insensitive, whereas Unix and Linux operating systems are case sensitive.

For ITX compliance, the following naming standard must be followed:

UDF 1.02 and ECMA 167 (second edition)

Support for hybrid Windows/Macintosh discs (whereby resource forks for the Macintosh operating system are preserved)

All files and directories must be developed with case sensitivity in mind. The recommended approach is to use only capital letters for all directories, file names, and HTML references. To be safe, only use A-Z, 0-9 and the underscore. The initial HTML file shall have a name of ITX.HTM.

ITX Directories:

The ITX.HTM file must be located in a directory that follows these rules. Other files, based on individual authoring needs may be located in any directory following any convention. There may be more than one ITX.HTM file. For example, there could be a different one for each platform supported, or just one primary one and one alternate for a single platform that requires special operations.

Directory Naming Conventions

| Directory name | Platform |
| --- | --- |
| COMMON | All (default) |
| LINUX | linux operating system |
| MAC | Macintosh |
| NINTENDO | Nintendo Dolphin |
| SONY | Playstation II and CE |
| NUON | VMLabs |
| WIN | Windows |
| SEGA | Sega Dreamcast |
| TOSHIBA | Toshiba |
| WIN | Windows |
| ZORAN | Zoran |
| To be determined | all other ITX directory names must be registered to insure no conflicts. |

Note that any new platform directory names should be reserved and assigned before use. However, each platform developer can control the directory structure under its reserved top-level directory name. For example, Sony could create a PS2 and PS3 directory under the SONY directory.

This directory structure allows for proprietary executable binary files for each platform. For example, a current PCFriendly DVD (i.e., a DVD in accordance with the present embodiment) can utilize the directory structure by placing the Windows version of software in a WIN directory, and a Macintosh version of software in a MAC directory. Upon insertion of the disc, the platform will initiate execution of the appropriate binaries (based on some platform-specific autorun feature) and then the binaries will load the ITX.HTM file.

The set-top player browser shall locate its starting file via the following logic:

Check for online updates enabled and online

If OK, then check web for update and use, if found

Else check for its platform-specific directory.

If the platform-specific directory exists and the ITX.HTM file is found, then start;

Else if the COMMON ROM directory exists and the ITX.HTM file is found, then start;

Else the disc is not an ITX disc and it should be played as a DVD-Video disc.

The above-described structure allows for device specific executable binary file for each type of device supported by a particular DVD disk. The platform-specific directory structure and its associated set of binaries enable any platform to run executables specifically designed for any device provided that such executables are available on the particular DVD disk being utilized. This capability, in essence, allows the device specific binaries to override general purpose ITX content or override a standard browser mechanism. While the actual ROM content may reside in a device specific directory, it is recommended that all content reside in the common directory when possible. The common directory can support any number of subdirectories, including device specific subdirectories.

The common directory stores, in most cases, the actual ITX content (versus platform specific binaries). It is recommended that all ITX content (even platform specific ITX content reside in the common directory as this provides an intuitive content development approach. By maintaining a single content directory, Java Script can easily be used to detect platforms and render appropriate HTML players pages tailored to specific devices.

There may be cases where device specific binaries may be included on the DVD disk, but still the general-purpose content. For example, an ITX disk can utilize the directory structure by placing a Windows version of software in the WIN directory, and the Macintosh version of the software in the MAC directory. Upon insertion of the ITX disk, the platform will initiate execution of the appropriate binaries (based on a device specific feature, such as autorun) and then the binaries will load the index.htm file located in the common directory, the starting point for any general-purpose ITX disk.

The starting or entry point is the index.htm file, with which resides in the top level of the common directory. It is recommended that all ITX content (with the exception of device-specific binaries) be stored in the common directory. Java Script can then be used to detect platforms and render appropriate HTML pages tailored to specific platforms. The index.htm file will be the background "container" web page while standard playback occurs. This page enables Java Script event handlers to be loaded and activate to handle events during playback. The meta-data of the index.htm file contains the ITX-API version information.

Figure 2A:
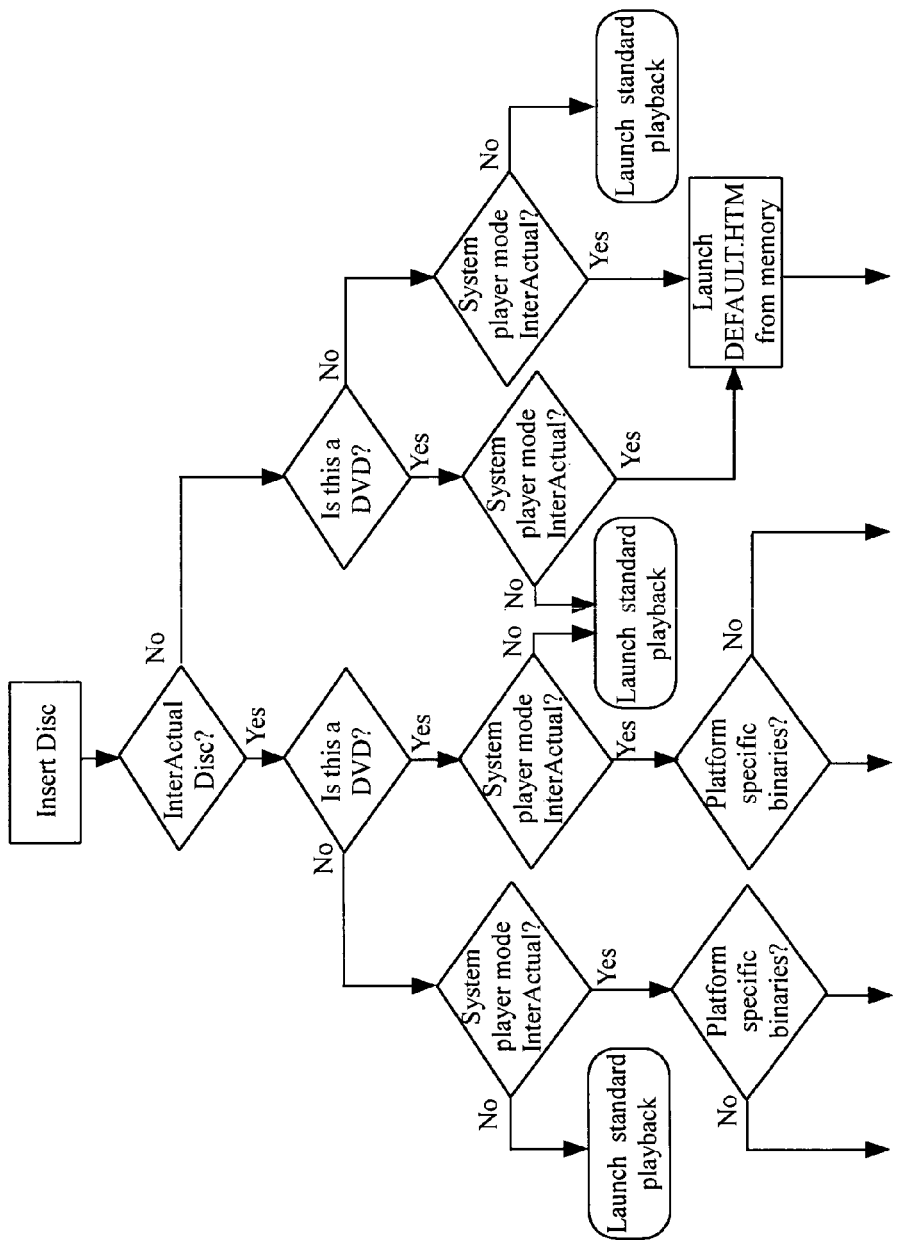
FIG. 2A is a flow chart illustrating steps traversed upon insertion of a DVD disk (or other media) into a device, such as a DVD player.

Referring to FIG. 2A, a flow chart is shown of steps traversed upon the coupling of a storage medium with, e.g., insertion of a DVD disk into, a device, e.g., a personal computer, a consumer electronics device, a game console, or the like. Steps traversed upon insertion of the DVD disk into the device are divided into phases as follows. During the first phase, a disk detection algorithm determines if the disk has content in accordance with the present embodiment, i.e., whether the disk is an ITX disk, i.e., whether the disk contains ITX content. This determination is made by examining whether a file named index.htm is located in a "common" directory on the DVD disk.

If the index.htm file exists, then the DVD disk is an ITX disk. Otherwise, the DVD disk is determined not to be an ITX disk. During a second phase, a determination is made as to whether the DVD disk is a DVD-Video or a DVD-Audio, or whether a disk of another type has been inserted, such as a CD-DA. Logic for performing the second phase is included, generally, in the device, and this is not discussed in detail further herein. (Such logic is known.)

During a third phase, a determination is made as to a default playback mode of the device. This is determined by reading a "player mode" from the property, e.g., InterActual.PlayerMode. If the device is configured for "play" mode, ITX content, e.g., HTML content, is bypassed, whereas if the device is configured for ITX mode, then the ITX content is launched beginning with the index.htm file in the common directory. The ITX content itself can then be updated dynamically if the device is connected to the Internet, or an equivalent network. There is no Internet connection, or equivalent connection, the device renders ITX content from a ROM portion of the DVD disk.

For non-ITX disks, when the device is configured for ITX mode, a default content home page (called default.htm) is displayed and an Internet connection, or equivalent, is attempted to provide potential ITX content for the non-ITX disk.

During a fourth phase, platform specific file detection occurs, and a determination is made as to whether there are platform specific binary files on the DVD disk for the device. This is accomplished by searching for a predefined directory, as described above, associated with the device.

During a fifth phase, a determination is made as to whether a connection to the internet or similar network, can be made. This step is performed for ITX disks in order to determine whether updated content is available from a server. Additionally, for DVD disks without ITX content, a connection to an on-line database can be attempted, so that the database can be interrogated to determine whether a server containing content associated with the DVD disk is available. If such content is available, an interactive experience similar to that available on ITX disk can be offered to the user of the device. When the device is in "play" mode, then ITX disk can display an icon, to signify that ITX content is available from the DVD disks ROM area. If the user selects the icon, a content home page is displayed, i.e., default.htm, so that the user can switch to ITX mode.

Figure 3:
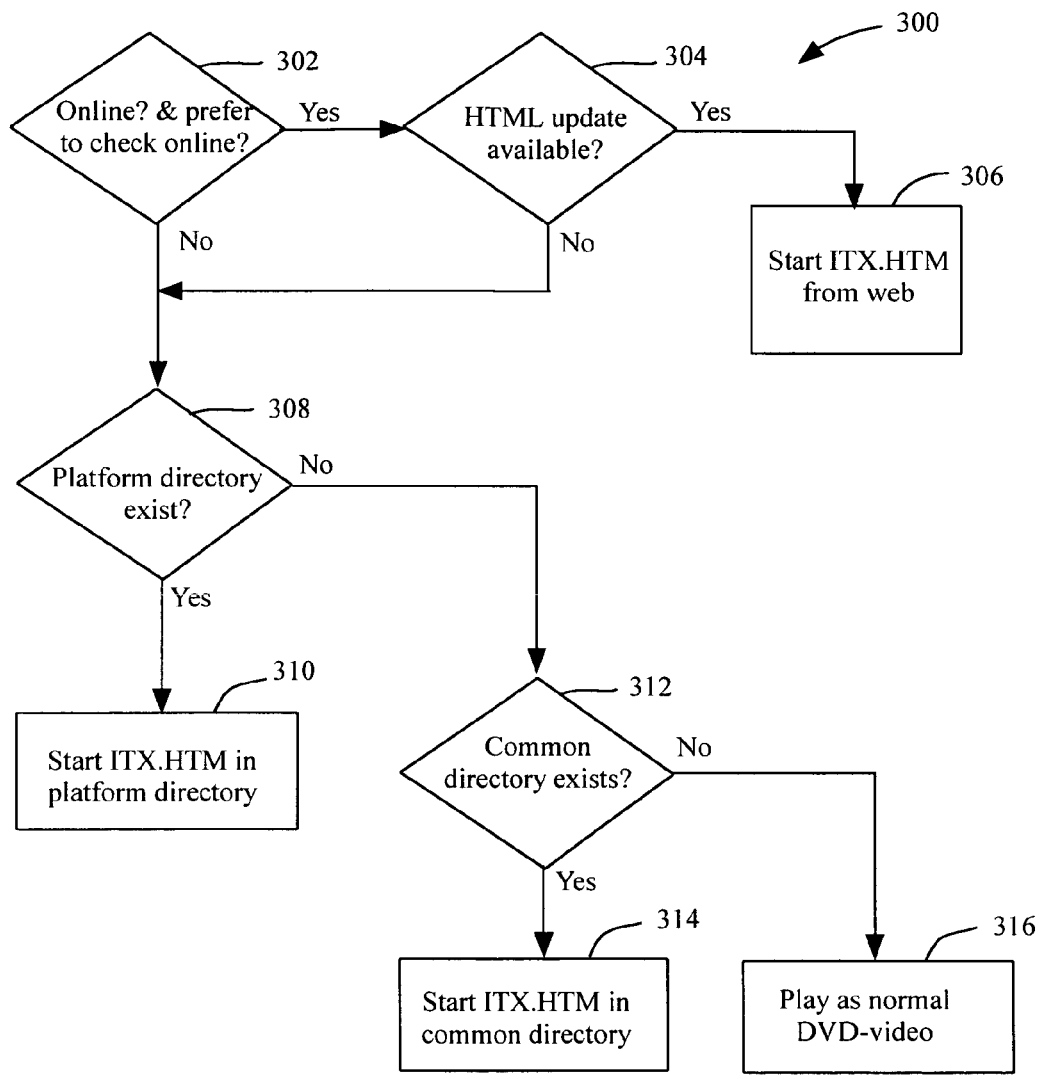
FIG. 3 is a flowchart illustrating logic for incorporating update information to supplement a DVD multimedia play experience.

With reference to FIG. 3, a process 300 for obtaining update information is described. The process 300 begins with a decision step 302 wherein a determination is made as to whether the user is online and whether the user prefers to check for updates online. If the answer to decision step 302 is no, then in another decision step 304 a determination is made as to whether HTML update information is available. If such information is available then in an operation 306, the ITX.HTM is started from the web and the update information is retrieved. If the answer to question 302 or both questions 302 and 304 are no, then in yet another decision step 308 a determination is made whether a platform directory exists, the platform directory applicable to the platform of the user device. If an appropriate platform directory does exist, then in an operation 310, ITX.HTM is started in the platform directory. If an appropriate platform directory does not exist, then in a decision step 312 a determination is made as to whether a common directory exists which can be used with the platform of the user device. If such a common directory does exist, then ITX.HTM is started in that directory. If such a common platform directory does not exist, then in a step 316 the DVD is played a normal video without Internet enhancement.

It is recommended that each player have a user setup that allows the ITX functionality to be overridden, such as:
- Check for ITX and start as ITX if found (default setting)
- Check for ITX and give the user a menu choice of ITX or Standard
- Show the ITX icon on the screen for several seconds when ITX is found (include a remote control function that restarts discs in ITX mode
- Play all discs as DVD-Video, ignoring ITX
- ITX Programming Interface (mandatory compliance):

This section describes the ITX application programming interface (API) for controlling and scripting ITX-enhanced discs. The API is divided into five sections:
- Embedding. Syntax for embedding DVD-Video within a web page. This section also addresses displaying video full screen and in a window.
- Commands. Commands control the playback and search mechanisms of a DVD-Video disc.
- Properties. Properties are used to query attributes of the DVD-Video and set certain configuration properties.
- Events. Events are used to trigger notification of various playback conditions, such as time changes, title changes and UOP changes. Events are essential for scripting and synchronizing the video with other assets.

Embedding:

This section describes how to embed DVD-Video within an HTML page and control its layout.

Computer operating systems shall embed DVD-Video using currently available embedding techniques. Examples for each of the major computer operating systems is are provided below:

Examples for embedding DVD-Video in HTML

| Operating System | Example |
|---|---|
| Windows | <object ID="PCFriendly" CLASSID="clsid:A0739DE5-571F-11D2-A031-0060977F760C" BORDER="1" WIDTH=50% HEIGHT=60% ></object> |
| Apple/Macintosh | <embed ID="PCFriendly" TYPE="application/x-pcfriendly-plugin" ALT="PCFriendly Plug In" HIDDEN="TRUE" ></embed> |
| Linux | TBD |
| Others | TBD |

After the DVD-Video object is embedded in the web page, it can be accessed using any style sheet, link, or scripting language. Values for the ID string must begin with a letter (A-Z or a-z) and may be followed by any number of letters, digits, hyphens, and periods up to a maximum of 48.

Unlike computers, set-top boxes do not generally have a full-blown operating system and browser. Therefore, the capabilities within the browser are often more restricted. For embedding DVD-Video within these platforms using ITX, the "PCFriendly" ID must be integrated within the embedded browser as any other tag structure. With this approach, any embedded browser that encounters the "PCFriendly" tag, would automatically associate this identifier with the ITX programming API described later in this section.

While many possible windows configurations are possible for displaying the update data, the update data is preferably provided on a screen in the following manner:
- Toggling between full screen
- Displaying within frame
- Dynamic resizing
- Commands:

Commands (also known as functions or methods in OOP terminology) control the playback and navigation mechanisms of a DVD-Video/Audio or CD-DA disc. Commands can be used by the calling application (HTML, C++, or other) to initiate a DVD/CD playback function. The commands supported by ITX are listed below.

All commands support return values as shown above.

See notes at the end of the table and for a description of the optional time and FX parameters designated by [*].

Items in square brackets [] are optional.

ITX Command Summary

| ITX Commands | Description | DVD Player | CD-DA | Support Level | Range |
|---|---|---|---|---|---|
| Open(filename | type) | Opens specified file name. See note 1. | Both | Y | Base | — |
| Play([*]) | Start playback of the DVD. | Both | Y | Base | — |
| Pause([*]) | Pause playback of the DVD (Pause_On). Subsequent issue of Pause( ) resumes playback (Pause_Off) | Both | Y | Base | — |
| Stop([*]) | Stop playback of the current DVD. Stops execution of current PGC and transfers to Stop State. | Both | Y | Base | — |
| FastForward([x[,*]]) | Fast forward the current DVD at x speed. (By default, x = 2) | Both | | Base | 2-99, although some players may allow only the DVD values of 2,4,8,16,32 |
| Rewind([x[,*]]) | Rewind the current DVD at x speed. (By default, x = 2) | Both | | Base | same as above |
| Slow([x[,*]]) | Play the current DVD at x speed. (By default, x = 2 for ½ speed). Supported Features should be checked first to determine if capability is supported. See note 2. | Both | | Adv | 2-99 (reciprocal values) |
| SlowReverse(x[,*]) | Play the current DVD at x speed in reverse. (By default, x = 2 for ½ speed). | Both | | Adv | same as above |

-continued

ITX Command Summary

| ITX Commands | Description | DVD Player | CD-DA | Support Level | Range |
|---|---|---|---|---|---|
| | Supported Features should be checked first to determine if capability is supported. See note 2. | | | | |
| Step([n[,*]]) | Steps playback of the DVD forward n frames. Supported Features should be checked first to determine if capability is supported. By default, n = 1. | Both | | Adv | 1- 30 |
| NextChapter([*]) | Halts playback of the current chapter and starts playback from the next chapter within the title. | Video | | Base | — |
| PrevChapter([*]) | Halts playback of the current chapter and starts playback from the start of the current chapter; or if near the start of a chapter goes to the previous chapter. | Video | | Base | — |
| NextTrack( ) | Halts playback of the current track and starts playback from the next track in the same Audio Title within the Title Group. | Audio | Y | Base | — |
| PrevTrack( ) | Halts playback of the current track and starts playback from the previous track in the same Audio Title within the Title Group. | Audio | Y | Base | — |
| NextDisplay([*]) | Presents the next visual display/slide in the display list to the user. | Audio | | Base | — |
| PrevDisplay([*]) | Presents the previous visual display/ slide in the display list to the user. | Audio | | Base | — |
| TitlePlay(t[,*]) | Start playback at the specified title index, t. (Initializes all GPRMs and SPRMs). | Video | | Base | 1-99 |
| ChapterPlay(t,c[,*]) | Start playback at the specified title index and chapter value. If in TT_DOM and already within specified title, ChapterSearch is issued to maintain all GPRM and SPRM values. Otherwise, ChapterPlay is issued and all GPRMs and SPRMs are initialized. | Video | | Base | t: 1-99 c: 1-99 |
| TimePlay(h,m,s,f[,*]) | Start playback at the specified. Specify time in hours, minutes, seconds, frames. (Computer must translate into milliseconds). If in TT_DOM or TT_GR_DOM and already within specified title, TimeSearch is issued to maintain all GPRM and SPRM values. Otherwise, TimePlay is issued and all GPRMs and SPRMs are initialized. | Both | | Base | h: 00-23 m: 00-59 s: 00-59 f: 00-29 |
| TitleGroupPlay(g[,*]) | Start playback at the specified title group number. | Audio | | Base | |
| TrackPlay(g,t[,*]) | Start playback at the specified title group number and track number. If in TT_GR_DOM and already within specified title group, TrackSearch is issued to maintain all GPRM and SPRM values. Otherwise, TrackPlay is issued and all GPRMs and SPRMs are initialized. In case of CD-DA, group number should be 1 by default. | Audio | Y | Base | |
| HiddenGroupPlay(g[,*]) | Plays desired hidden/locked group. | Audio | | Adv | |
| HiddenTrackPlay(g,t[,*]) | Plays desired hidden/locked track within Hidden Group. | Audio | | Adv | |
| HiddenTimePlay(h,m,s[,*]) | Plays from specific time within Hidden Group. | Audio | | Adv | h: 00-23 m: 00-59 s: 00-59 |
| Menu(x[,*]) | Display the specified menu. See note 3. | Both | | Base | 1-5 |
| GotoMenuID(x[,*]) | Displays menu associated with entered menu ID | Both | | Adv | — |
| GotoBookMark(x[,*]) | Continues playback at the specified | Both | Y | Adv | — |

-continued

ITX Command Summary

| ITX Commands | Description | DVD Player | CD-DA | Support Level | Range |
|---|---|---|---|---|---|
| SaveBookMark(x[,*]) | bookmark location by number. See note 4. Creates a bookmark at the current location to store with a given number. See note 4. | Both | Y | Adv | 0-n n is system dependent, about 32 |
| Resume([*]) | Resume DVD playback (if applicable based on Navigation). | Both | | Base | — |
| StillOff([*]) | Continue with still off. | Both | | Base | — |
| UOPMask( ) | Retrieve current UOPs. | Video | | Base | — |
| AutoMouseHide(b) | Show or hide the mouse cursor when the DVD is playing. (Hide occurs 2 seconds after no activity) | Both | | Adv | |
| UpButtonSelect([n]) | Selects the up direction button n times. By default n = 1. | Both | | Base | 1-36 |
| DownButtonSelect([n]) | Selects the down direction n times. By default n = 1. | Both | | Base | 1-36 |
| LeftButtonSelect([n]) | Selects the left direction button n times. By default n = 1. | Both | | Base | 1-36 |
| RightButtonSelect([n]) | Selects the right direction button n times. By default n = 1. | Both | | Base | 1-36 |
| ButtonActivate( ) | Activate the current highlighted button. | Both | | Base | — |
| ButtonSelectAndActivate(n) | Activate the specified highlighted button, where n is the button number between 1 and 36. | Both | | Base | 1-36 |
| AudioSelect(n) | Sets the stream number of the Audio to play | Both | | Base | 1-8 |
| SubPictureSelect(n) | Sets the stream number of the Subpicture to display | Video | | Base | 1-32 |
| SubPictureEnable(n) | Enables or Disables Subpictures (sub-titles) | Video | | Base | 0 = off 1 = on |
| AngleSelect(n) | Sets the stream number of the Angle to play | Video | | Base | 1-8 |
| MenuLanguageSelect(n) | Selects the language for the System Menu according to the language code (n). Only available in a Stop State. | Both | | Base | |
| TextLanguageSelect(n) | Selects the language for the Audio Text Data. | Audio | | Base | |
| ParentalLevelSelect(n) | Selects parental level of player. | Video | | Base | 1-8 |
| ParentalCountrySelect(n) | Selects the country for the parental level. | Video | | Base | |
| KaraokeSelect(x) | Changes the Audio mode for Karaoke. | Video | | Adv | 1: vocalist 1 2: vocalist 2 3: guide melody |
| Zoom([x,y[,*]]) | Zoom (or scale) by a percentage factor of x (horizontal) and y (vertical). Individual players may support various zoom ranges, but 25% to 400% is recommended (2500 < x,y < 40000). See note 5. X and Y are integers, 100 times the percentage. By default, x and y are 10000 (100%). | Both | | Adv | 2500-40000 (16-bit unsigned values) |
| Pan([x,y[,*]]) | Set center point of zoomed display to x,y coordinates based on percentage of normal content full screen display. See note 5. X and Y are integers, 100 times the percentage. By default, x and y are zero (center point). | Both | | Adv | −5000 to +5000 |
| VideoBlending([a,c[,*]]) | Controls whether the video is played in its own window/full screen (a = 0) or if the video is in the background and HTML content is blended on top of it (where a is the alpha blending value from 1 to 255; c is HTML the HTML background color that is clear). By default, a = 255 (HTML on top) and c = white (white HTML background is clear for video to show through). See note 6. | Both | | Adv | a: 0-255 c: 32-bit ARGB |

ITX Command Summary

| ITX Commands | Description | DVD Player | CD-DA | Support Level | Range |
|---|---|---|---|---|---|
| Bitmap Layer Extensions | | | | | |
| CreateLayer(b,c,r,d,p) | Create an overlay layer. b is the bitmap overlay ref number (or handle) Initialize to color c. r is the resolution. d is the number of bits per pixel. p is the palette when b = 1,2,4 or 8. See note 7. | Both | Y | Adv | b: 1-9 c: 32-bit ARGB r: 1-4 d: 1, 2, 4, 8, 15, 16, 24, 32 p: palette tbl |
| ChangePalette(b,p[,*]) | Change the palette for layer b | Both | Y | Adv | b: 1-9 p: palette tbl |
| DestroyLayer(b) | Destroy an overlay layer. If b = 0 then destroy all layers. | Both | Y | Adv | 1-9 |
| ShowLayer(b[, *]) | Make a layer visible | Both | Y | Adv | 1-9 |
| HideLayer(b[, *]) | Hide a layer | Both | Y | Adv | 1-9 |
| SetVectorDraw(b,c,w[,*]) | Set default drawing color (c) and width (w) for layer b. c: ARGB or index into palette w: 1 to 16 pixels | Both | Y | Adv | b: 1-9 c: 32-bit ARGB or palette index w: 1-16 |
| SetVectorCorners (x1,y1,x2,y2) | Set the user coordinate system to: x1,y1 (upper left corner); x2,y2 (lower right corner). The default is 0,0 ... 720,480 for NTSC and 0,0 ... 720 576 for PAL; which matches one to one to pixels in the layer. (All values are 16-bit signed integers) This coordinate system is used for VectorMove and VectorDraw | | | | x: 0-720 (or 1920) y: 0-480, 576 (or 1080) |
| VectorMove(x, y,b[,*]) | Move to x,y on layer b. (x,y based on SetVectorCorners) | Both | Y | Adv | x: 0-720 (or 1920) y: 0-480, 576 (or 1080) b: 1-9 |
| VectorDraw(x, y,b[,*]) | Draw to x,y on layer b. (x,y based on SetVectorCorners) | Both | Y | Adv | x: 0-720 (or 1920) y: 0-480, 576 (or 1080) b: 1-9 |
| DisplayImage (f, b, a[,*]) | Display image from file (types: JPEG, Gif) in layer b, with alpha blend level a. (Layer must have sufficient bit depth.) | Both | Y | Adv | f: filename b: 1-9 a: 0-255 |
| Time and FX | | | | | |
| SetRelTime([ t]) | Set the relative time counter to t. (unsigned 32-bit integer in ms) See GetRelTime property. The relative time affects only commands issued for delayed execution (queued). Once queued commands use machine absolute time. By default, t = 0. | Both | Y | Base | t: 0-$2^{31}$ unsigned 32-bit integer |
| FlushCmdQueue() | Flush and/or initialize the command queue. | Both | Y | Base | |
| Misc Extensions | | | | | |
| SetMixVolume (x[,*]) | Set primary audio stream volume level to percentage x to allow overmixing. | Both | Y | Adv | x: 0-100 0 = mute main audio |
| FullScreen(w [,*]) | Toggles video playback between full screen and window. | Both | | Base | 0 = full 1 = window |
| NetConnect([ u[,*]]) | Establish WWW connection to optional URL provided. By default, connection is made with no URL. | Both | Y | Adv | u = text string |
| Computer Only: | The following commands should be ignored in set-top players | | | | — |
| Close( ) | Close the driver and stop playback of the current DVD. | Both | Y | Base | |
| ShowControls (x,y[,*]) | Show or hide the video controls in full screen mode, at x,y. Use −1,−1 to hide. | Both | Y | Base | x: 0-1920 y: 0-1200 |
| ShowContextMenu( ) | Controls the right mouse click context menu. | Both | | Base | — |
| PopUpMenu( ) | Displays and allows the audio languages, sub- | Both | | Base | — |

-continued

ITX Command Summary

| ITX Commands | Description | DVD Player | CD-DA | Support Level | Range |
|---|---|---|---|---|---|
| | pictures, and angles to be set to those currently available. | | | | |
| SuppressErrors(b) | Suppresses display of error messages (0 = suppress display of error messages, 1 = display error messages) | Both | Y | Base | 0 = suppress 1 = show |

Command Notes:

[*] optional parameters

Special effects and timed operations are performed with four optional parameters. See section 2.1.2.2.3 for complete details.

1. Open

Opening of VOB files and MPEG files is required for baseline support. Other file types are advanced features. An open file can be played, paused, stopped. Fast forward and rewind are not available. Stopping causes the file pointer to be reset to the start of the file.

2. Slow and Slow Reverse

If slow is supported a speed of ½ is required. Other slow speeds may also be supported; decreasing powers of two are recommended: ¼, ⅛, 1/16, etc although any value from ½ to 1/99 is allowed. Integer reciprocal values are used for the speeds, such as 2 for ½ and 4 for ¼, etc.

3. Menu

Menu choices are:
 1: Title Menu
 2: Root Menu
 3: Chapter Menu
 4: Audio Languages Menu
 5: Subpicture Languages Menu 4. Bookmarks The bookmarks are assigned a number when set. A GotoBookMark returns to the same position on the disc as when the bookmark was set (saved). Preservation of bookmarks during powerdown is not required, however, if implemented, bookmarks shall be unique to the disc (using a generated disc id). A minimum of one bookmark per disc is required if implemented (32 recommended). It is recommended that bookmarks save the entire DVD-Video or DVD-Audio state, but this is not required. At a minimum, the correct title and time must be saved.

5. Zoom and Pan

Zoom parameters are based on a percentage, so integer values of 10000 and 10000 (x and y) indicate 100% of normal full screen display with no zoom. Normally the x and y scale factors should be the same to maintain a correct aspect ratio. When zooming to a value greater than 100%, by default, the center point of the image remains on the center of the display. Panning allows moving the center point of the portion of the image to be displayed. These x and y pan parameters are provided as a percentage of the display from −50% to +50% using integer values from −5000 to +5000. (This is done so that the differences between NTSC and PAL do not have to be calculated in pixels. Additionally, it may also be possible to use the same HTML code for handling 4:3 and 16:9 as well.) If the pan parameters would cause the display to pan off the edge of the video, then the platform software shall only set that panning parameter to the largest or smallest value that keeps the video in the display area.

6. Blending

This advanced feature allows an HTML page to be constructed that includes a background color (the colorkey) that is treated as clear. Other information on the page (graphics or text) is then alpha blended with the video. An alpha value of 0 indicates that the video shows everywhere. An alpha value of 255 indicates that the HTML page shows everywhere (except where it is clear as defined by the colorkey value). This allows, for example, placing textual titles on top of the video (or blended with the video). Graphical menus can be added in the same manner. A minimum of 16 (256 recommended) discreet alpha values are required if this feature is supported. However, the alpha blend parameter is always from 0 to 255.

7. Bitmap Layers

The bitmap layer features allow defining and using multiple layers (possibly only one active at a time depending on the playback device) with other layers stored in memory and ready to be activated when needed. This is how an event moderator can remotely draw onto the video image. The number of bits per pixel (color depth) can be 1, 2, 4, 8, 15, 16, 24 or 32. For bpp of 1, 2, 4 and 8 a palette must be provided (32-bit ARGB data). It is anticipated that the most frequently used capability will be bpp values of 1 or 2 to be used for image markup, like a chalkboard with 1 to 4 colors. Bpp values of 15, 16, 24 and 32 allow images to be used on a layer.

Errors and Warnings

All commands shall return one of the following error codes

Error and Warning Summary

| number | name | description | commands |
|---|---|---|---|
| 0 | OK | Successful | all |
| 1 | General Error | Other or Unknown error condition | all |
| 1 | FileNot Found | File not found | Open, DisplayImage |
| 2 | Not-Supported | File type or feature not supported | |
| 3 | NoDisc | Attempt to play with no disc | Play, + others? |
| 4 | BadParam | Parameter out of range | many |
| 5 | Param-Error | Parameter out of range for current disc or current condition | many |
| 6 | NoMem | Not enough memory for operation | CreateLayer, DisplayImage |
| 7 | Queue-Full | Command queue is full | Time delayed command |
| 8 | Queue-Fail | Timed command error (such as overlapping command) | Time delayed command |
| 9 | Queue-Warn | Timed command accepted, but action may be emulated | Time delayed command |

Figure 4:
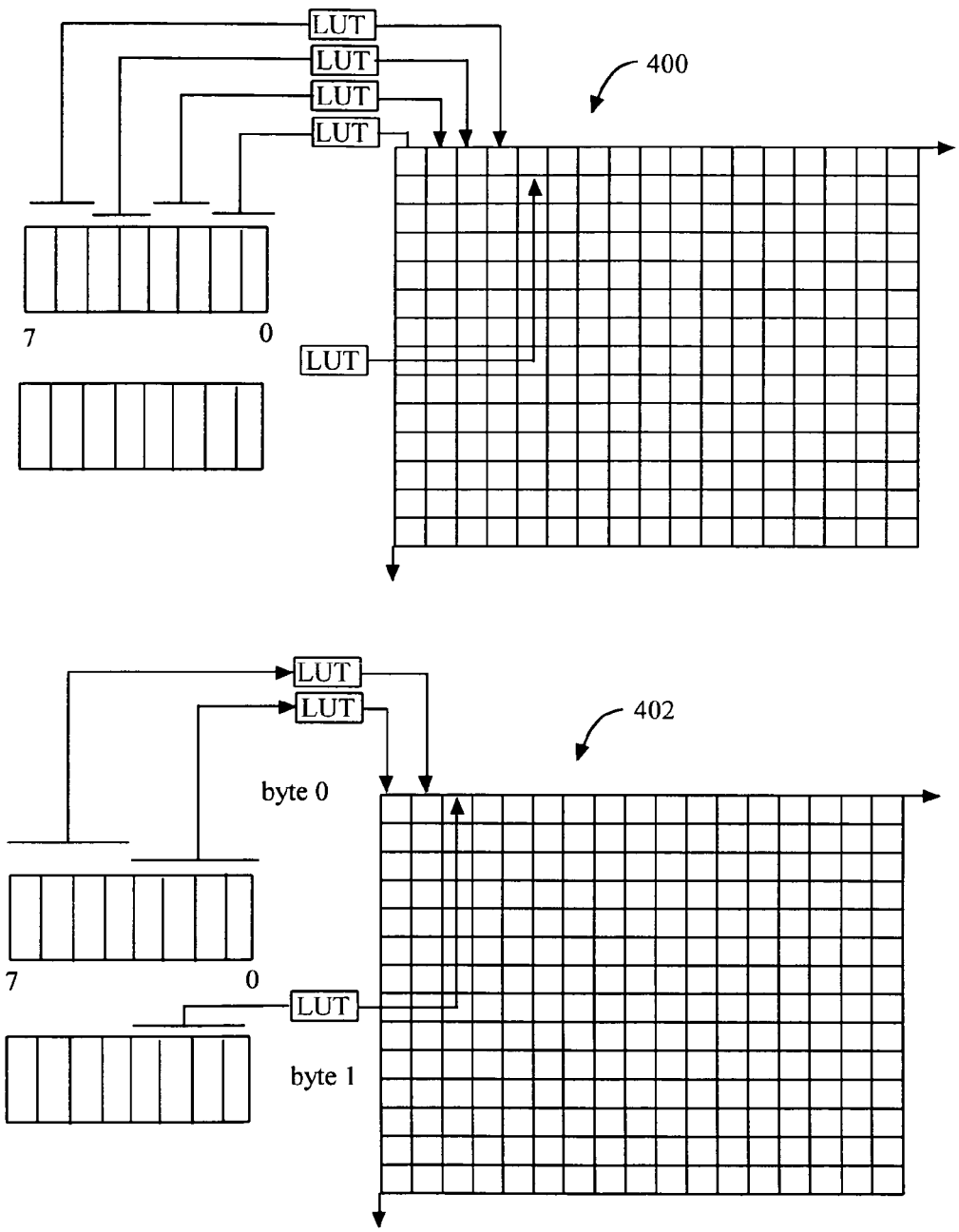
FIG. 4 is graphical representation of data layouts for bitmap layers.

Layers and pixel formats:

With reference to FIG. 4, a data layout 400 for a layer with 2 bpp, resolution is depicted. Also depicted is a data layout 402 for a layer with a 4 bpp resolution. The pixel formats for data in a layer may be stored (internally) in any format. The diagrams on the next page illustrate how it might work in one implementation. The data in the LUT (lookup table) is provided as a color palette by CreateLayer( ) or ChangePalette( ). Each entry in the palette is a 32-bit integer as follows:

byte 0: blue (least significant byte)
byte 1: green
byte 2: red
byte 3: alpha

An alpha value of 0 indicates a transparent color (i.e. the video shows through) and 255 is a solid opaque color (i.e. no video shows through). The first entry in every color palette should consist of 4 bytes of zero, a clear color. The default color value, c, in CreateLayer( ) should normally be zero to initialize the layer to a clear color. Special visual effects can be created by use of other values, such as initializing a layer to red, then erasing it off with a series of drawing commands and/or by changing alpha values, in the color palette, etc. Layers and data on them are not affected by video transitions and special effects having to do with video playback.

As described in the next section, some commands may be modified with time parameters and special effects or transitions. Of particular note to the bitmap layer commands are the ChangePalette( ) and VectorDraw( ) commands. A VectorDraw( ) command with a time duration simply draws a line incrementally. However, the ChangePalette( ) command with a time duration should be implemented such that there are three complete palettes, the original, the final and the current palette. At each time increment every palette table entry is interpolated towards its final value. The ShowLayer( ) and HideLayer( ) commands may have a timed special effect applied to them such as a wipe or fade.

Transitions, Special Effects and Timing:

Similar to how an author might use transitions and special effects during video editing, ITX allows a subset of these types of capabilities, depending on the unique capabilities of each playback system. If a system cannot produce the effect due to hardware or software limitations then it should gracefully degrade to some emulation or simply produce no effect at all, but concluding at the same logical end point.

Transitions can be used, for example, when switching from one scene to another with a time search or chapter search. If no effect is specified, then the playback system would normally produce a standard cut or possibly insert black frames between the scenes. However, if a wipe left is specified, then the final still frame of scene 1 is shown and scene 2 wipes in from the left at the specified rate. (No attempt is made to provide a moving image for both scenes simultaneously.)

The following table details the optional parameters and their ranges:

| Optional Parameter format for timed commands and special effects | | |
|---|---|---|
| | Description | range |
| xxx(?[t1,t2,fx,p]) see command list in 2.1.2.2 where [*] is replaced by | Command xxx with optional parameters as follows: t1: time 1 (0 or relative start time) | t1: 0-$2^{31}$ |

| Optional Parameter format for timed commands and special effects | | |
|---|---|---|
| | Description | range |
| [t1,t2,fx,p] | t2: time 2 (duration (if t1=0) or relative end time) fx: special effect number p: extra parameter based on fx | t2: 0-$2^{31}$ fx: 0-999 p: 32-bit value based on x |
| | There are two basic modes: 1. If t1=0, then t2 is the command duration. 2. If t1>0, then t1=starting relative time and t2=ending relative time. t1 and t2 are unsigned 32-bit integers in milliseconds. The possible choices for the variable numbers of parameters are: t1 (not allowed) t1, t2 t1, t2, fx t1, t2, fx, p | all unsigned 32-bit integers |

Notes:
1. Immediate Execution
To cause a timed command or special effect to start immediately, the t1 parameter must be set to zero (or to a value less than the current relative time). The t2 parameter contains the duration of the command (when t1 = 0). If t1 is greater than zero, but less than the current relative time then the duration is equal to t2-t1. A negative duration is treated as the shortest possible time for that operation.
2. Delayed Execution
To cause a command to be queued for later execution, the t1 parameter must be set to a non-zero value greater than the current relative time. To accomplish this the current relative time can be queried via the GetRelTime property. Alternatively, the relative time can be set using the SetRelTime command. Once a command has been queued, the player shall convert the relative time to an absolute time for its scheduled execution and cannot be changed. (However, the command queue can be flushed.)
3. SpecialFX.
Any immediate or delayed execution command can have a special effect or transition (with optioannl parameter) added to modify its operation. All special effects and transitions must be accepted by all players but may be emulated or ignored if the effect cannot be performed. The same is true of the timed nature of various commands-if a player has a fixed duration for executing a particular command, then the requested duration is ignored.
4. Command Macros
Macros of commands can be created by using the SetRelTime and then issuing various commands based with offsets from that time.
5. Command queue
The player must support a command queue with a depth of at least two items (eight is recommended; PC/Mac: 64 is recommended). That is, two items are pending execution at a later time while further commands continue to execute.
If a command is accepted for the queue, then it must be executed (unless flushed or some other operation negates or overrides its action). Times stored in the queue should be in an absolute machine time (not relative time and not DVD playback time) so that subsequent changes to the relative time do not affect commands already queued.
6. Conflicting commands
Because it is possible to schedule commands that have overlapping times, these must be checked prior to acceptance for the queue. Non-conflicting, overlapping operation can be accepted. Conflicting overlapping operations may be accepted also if the operations can still be logically completed. Conflicting overlapping operations that are accepted shall return a warning code.
An example of a conflicting operation would be to schedule a chapter advance with a 5 second fade in and a second chapter advance after only 2 seconds. Robust internally interlocks must be used if there is any chance of an erroneous program to lock up a machine due to the use of timed or delayed execution commands. A fallback to basic sequential operation is suggested.

Exemplary transitions and special effects according to an embodiment of the invention include the following.

| List of Transitions and Special Effects | | | |
|---|---|---|---|
| num | name | description | parameters |
| 0 | none | standard cut, no effect | none |
| 1 | dissolve | old scene dissolves away, new scene appears | none |
| 2 | fade | old fades to color, new scene fades in | color: 32-bit ARGB |
| 3 | wipe | old scene is wiped off revealing new scene | LRTB |
| 4 | reveal | old scene is pulled off, revealing new scene | LRTB |
| 5 | slide | new scene slides on, covering old scene | LRTB |
| 6 | push | new scene pushes old scene off | LRTB |
| 7 | peal | old scene is peeled off (like a wipe, but 3D) | LFTB |
| 8 | corner wipe | wipe from a corner | ULURLLLR |
| 9 | corner reveal | reveal from a corner | ULURLLLR |
| 10 | corner slide | slide from a corner | ULURLLLR |
| 11 | corner peal | peel from a corner | ULURLLLR |
| 12 | random boxes | random boxes poke holes in old scene revealing new scene | box size in pixels |
| 13 | blinds | horiz or vert blinds wipe off revealing new scene | blind size in pixels |
| 14-99 | | reserved for other transitions | |
| 100 | none | standard video and audio | none |
| 101 | YUV | adjustments are made to luma and chroma | byte 0: V<br>byte 1: U<br>byte 2: Y<br>byte 3: reserved 0<br>(signed byte adjustments) |
| 102 | snow | snow is added to the display | 0 = none<br>255 = maximum |
| 103 | ripple | video is played like underwater | 0 = none<br>255 = maximum |
| 104-999 | | reserved | |
| 1000 and up | | assignable for specific system effects | |

Notes:
LRTB: 1 = left, 2 = right, 3 = top, 4 = bottom
ULURLLLR: 1 = upper left, 2 = upper right, 3 = lower left, 4 = lower right
All transitions and/or effects do not make sense with each command. The guiding philosophy should be to implement only those that make sense. The following table is the recommended set features for the most advanced playback systems with $Y_1$ being the most basic to $Y_4$ the most advanced.

| Recommended Commands and Special Effects Matchups | | | |
|---|---|---|---|
| ITX Command | time delayed (queued) | time duration | effect/ transition |
| ChangePalette (b,p[,*]) | $Y_1$ | $Y_4$ | |
| ChapterPlay (t, c[,*]) | $Y_1$ | $Y_2$ | $Y_2$ |
| DisplayImage (f, b, a[,*]) | $Y_1$ | $Y_3$ | $Y_3$ |
| FastForward ([x[,*]) | $Y_1$ | $Y_2$ | $Y_2$ |
| FullScreen (w[, *]) | $Y_1$ | $Y_3$ | |
| GotoBookMark( x[,*]) | $Y_1$ | | |
| GotoMenuID (x[, *]) | $Y_1$ | $Y_2$ | $Y_2$ |
| HiddenGroup-Play (g[,*]) | $Y_1$ | | |
| HiddenTimePlay (h,m,s[,*]) | $Y_1$ | | |
| HiddenTrack-Play (g,t[,*]) | $Y_1$ | | |
| HideLayer (b[, *]) | $Y_1$ | $Y_3$ | $Y_3$ |
| Menu (x[,*]) | $Y_1$ | $Y_2$ | $Y_2$ |
| NetConnect ([u [,*]]) | $Y_2$ | | |
| NextChapter ([ *]) | $Y_1$ | $Y_2$ | $Y_2$ |
| NextDisplay ([ *]) | $Y_1$ | $Y_2$ | $Y_2$ |
| Pan ([x,y[,*]]) | $Y_1$ | $Y_2$ | |
| Pause ([*]) | $Y_1$ | $Y_2$ | $Y_2$ |
| Play ([*]) | $Y_1$ | $Y_2$ | $Y_2$ |
| PrevChapter ([ *]) | $Y_1$ | $Y_2$ | $Y_2$ |
| PrevDisplay ([ *]) | $Y_1$ | $Y_2$ | $Y_2$ |
| Resume ([*]) | $Y_1$ | $Y_2$ | $Y_2$ |
| Rewind ([x[,*] ]) | $Y_1$ | $Y_2$ | $Y_2$ |
| SaveBookMark ( x [,*]) | $Y_1$ | | |
| SetMixVolume ( x[,*]) | $Y_1$ | | |
| SetVectorDraw (b,c,w[,*]) | $Y_1$ | | |
| ShowControls ( x,y[,*]) | $Y_1$ | $Y_3$ | $Y_3$ |
| ShowLayer (b[, *]) | $Y_1$ | $Y_3$ | $Y_3$ |
| Slow ([x[,*]]) | $Y_1$ | $Y_2$ | $Y_2$ |
| SlowReverse (x [,*]) | $Y_1$ | $Y_2$ | $Y_2$ |
| Step ([n[,*]]) | $Y_1$ | | |
| StillOff ([*]) | $Y_1$ | | |
| Stop ([*]) | $Y_1$ | $Y_2$ | $Y_2$ |
| TimePlay (h,m, s,f[,*]) | $Y_1$ | $Y_2$ | $Y_2$ |
| TitleGroupPlay (g[,*]) | $Y_1$ | | |
| TitlePlay (t[, *]) | $Y_1$ | $Y_2$ | $Y_2$ |
| TrackPlay (g,t [,*]) | $Y_1$ | | |
| VectorDraw (x, y,b[,*]) | $Y_1$ | $Y_3$ | |
| VectorMove (x, y,b[,*]) | $Y_1$ | $Y_3$ | |
| VideoBlending ([a,c[,*]]) | $Y_1$ | $Y_2$ | |
| Zoom ([x,y[,*]]) | $Y_1$ | $Y_2$ | |

ITX Events

Events are integral to synchronizing DVD-Video with other media. With these events, web pages can be synchronized with the audio or video. For example, each Chapter-Event (start of new chapter) can change an HTML storyboard that corresponds to the movie. Time events can be used to coordinate advertising messages in HTML while the video is playing: when James Bond is driving his BMW, an appropriate web page (BMW or auto sales site) can automatically be displayed at the same time.

The value of events is that these external media do NOT have to be embedded or even be known at the time the DVD-Video is authored. This flexibility keeps DVD-Video authoring on schedule and greatly minimizes the authoring costs while adding valuable and unique features to each disc.

Events can be used by the calling application (HTML, C++, or other) to receive notification of DVD playback status. If a platform does not support an event, then an error code must be returned when its use is attempted. Supported events are:

ITX Events Summary

| ITX Events | Description | CD-DA | Support Level | Range |
|---|---|---|---|---|
| TitleEvent (t) | Called when title changes. Returns the new title number in t. | | Base | 1-99 |
| ChapterEvent (c) | Called when chapter changes. Returns the new chapter number in c. | | Base | 1-99 |
| TitleGroupEvent (g) | Called when title group changes. Returns the new title group number in g. | | Base | 1-tbd |
| TrackEvent (t) | Called when the track changes. Returns the new track number in t. | Y | Base | 1-tbd |
| TimeEvent (e,t) | Called on time change. Returns elapsed time in e and total time in t. Both in milliseconds. | | Base | e: 1-$2^{31}$ t: 1-$2^{31}$ ($\sim 2^{24}$ is practical limit |
| DisplayChange (x) | Called when slide/display list changes. Returns slide number in x. | | Base | tbd |
| AngleEvent (x) | Called on angle change. Returns new angle number in x. | | Base | 1-9 |
| StateEvent (x) | Called when play state changes (i.e., play to pause). Returns state in x. See CurrentState property for values. | | Base | 0-6 |
| SpeedEvent (x) | Called when speed changes (i.e., play to scanning). Returns new speed in x. | | Base | 1-32 |
| UOPSEvent (n) | Called when any UOP changes. Returns UOPs array in n. | | Base | 32 16-bit values |
| DomainEvent (x) | Called when domain changes. Returns domain in x. | | Base | |
| MenuEvent (x) | Called when menu ID changes. Returns the ID of the new menu in x. | | Adv | |
| MenuButtonEvent (x) | Called when user clicks a button on a menu. Returns the ID of the button selected in x. | | Adv | 1-32 |
| MouseEvent (b,x,y) | Called when the user clicks either the left or right mouse button. Returns mouse button in b, x coordinate in x, and y coordinate in y. | | Adv | b:tbd x:0-720 y: 0-480 or 576 |
| AudioEvent (x) | Called when user changes audio track. Returns audio number in x. | Y | Base | 1-tbd |
| SubpictureEvent (x) | Called when user changes subpicture track. Returns subpicture number in x. | | Base | 1-32 |
| AngleEvent (c,m) | Called when user changes video angle. Returns current angle number in c and total number of angles in m. | | Base | c: 1-9 m: 1-9 |
| MenuLanguageEvent (x) | Called when user changes menu language. Returns menu language number in x. | | Base | 1-tbd |
| TextLanguageEvent (x) | Called when user changes text language. Returns text language number in x. | | Base | 1-tbd |
| VideoErrorEvent (n) | Called when an error occurs. Returns error number in n. | | Base | tbd |
| ParentalEvent (p,c) | Called when parental control changes. Returns level in p and country in c. | | Adv | p: 1-8 c: tbd |
| KaraokeEvent (b) | Called when karaoke event changes. Returns 1 if karaoke track has begun playing, 0 if just finished. | | Adv | 0-1 |
| EjectEvent ( ) | Called when disc is ejected from device. No return value. | Y | Base | — |
| InsertEvent ( ) | Called when disc is inserted into device. No return value. | Y | Base | — |

ITX Properties

Properties can be used to find information about commonly used variables; such as time, title and chapter. All properties must be supported even if the advanced feature itself is not supported. Non-supported features may return a reasonable default value (for example if the zoom feature is not supported the zoom properties should always return 10000.) If a feature is not supportable and there is no reasonable value, then a −1 should be returned.

The following properties are supported:

ITX Properties Summary

| ITX Property | Description | CD DA | Support Level | Range |
|---|---|---|---|---|
| CurrentElapsedTime | Elapsed time of current title (in milliseconds) | Y | Base | 0-$2^{31}$ |
| CurrentTotalTime | Total time of current title (in milliseconds) | | Base | 0-$2^{31}$ |

ITX Properties Summary

| ITX Property | Description | CD DA | Support Level | Range |
|---|---|---|---|---|
| CurrentTitle | Currently playing title | | Base | 0-99 |
| CurrentTitleGroup | Currently playing title group | | Base | 0-99 |
| CurrentChapter | Currently playing chapter | | Base | 0-99 |
| CurrentTrack | Currently playing track | Y | Base | 0-99 |
| CurrentDisplay | Currently playing display list item | | Base | 0-99 |
| CurrentState | Current play state (0=None, 1=Scanning, 2=Stop, 3=Pause, 4=Play, 5=Slow Play, 6=Menu) | Y | Base | 0-6 |
| CurrentDomain | Current domain | | Base | bd |
| CurrentAudio | Current audio track | Y | Base | 0-99 |
| CurrentSubpicture | Current sub picture track | | Base | 0-31 |
| CurrentAngle | Current video angle | | Base | 1-9 |
| CurrentMenuLang | Current menu language | | Base | 1-8 |
| NumAudio | Number of audio languages/tracks currently available | | Base | 1-8 |
| NumSubpicture | Number of subpictures currently available | | Base | 0-31 |
| NumAngles | Number of angles currently available | | Base | 1-9 |
| NumMenuLang | Number of menu languages available | | Base | 1-8 |
| GetAudioLanguage (x) | Returns audio language (and extensions) for specified audio number x. Returned audio language is the 2-digit locale. | | Base | 0-99 |
| GetSubpictureLanguage (x) | Returns subpiucture language (and extensions) for specified subpicture number x. Returned subpicture language is the 2-digit locale. | | Base | 0-99 |
| GetMenuLanguage (x) | Returns menu for specified menu number x. Returned menu language is the 2-digit locale. | | Base | 0-99 |
| SupportedFeatures | Returns feature bits corresponding to capabilities of current system (Must be available before the navigator is in the play state). See section 4.1 and 4.2 for details. | Y | Base | 32-bit mask |
| Version | Returns version of platform. This field can also be used to determine parsing of certain components in the SupportedFeatures property. Returns major version and minor version unique to each playback system. | Y | Base | Two 16-bit integers |
| CurrentZoomX | Current Zoom X value | | Base | Unsigned 16-bit |
| CurrentZoomY | Current Zoom Y value | | Base | Unsigned 16-bit |
| CurrentPanX | Current Pan X value | | Base | Unsigned 16-bit |
| CurrentPanY | Current Pan Y value | | Base | Unsigned 16-bit |
| CurrentMenuID | Current ID associated with currently selected menu | | Base | 0-99 |
| NumLayers | Number of overlay layers currently possible (based on memory available at resolution 1, bpp=1) See note 8. | Y | Base | 0-9 |
| MaxLayers | Maximum number of simultaneous overlay layers supported See note 8. | Y | Base | 0-9 |
| MaxAlpha | Maximum number of alpha blending steps supported. (i.e. DVD subpictures requires 16 levels but hardware may support 256 levels). | Y | Base | 16, 32, 64, 128, 256 |
| MaxFast | Maximum number of fast speeds. | | Base | 0-99 |
| MaxFastReverse | Maximum number of reverse fast speeds. | | Base | 0-99 |
| MaxSlow | Maximum number of slow speeds. Could be zero if not supported. | | Base | 0-99 |
| MaxSlowReverse | Maximum number of reverse slow speeds. Could be zero if not supported. | | Base | 0-99 |
| MaxCmdQueue | Maximum size of the command queue | Y | Base | 0-255 |
| MaxBookmarks (x) | Maximum number of bookmarks based on x: 1: total in volatile memory 2: total in non-volatile memory 3: per disc in volatile memory 4: per disc in non-volatile memory | Y | Base | Unsigned 16-bit |
| NumBookmarks (x) | Number of bookmarks available based on x. (same as above) | Y | Base | Unsigned 16-bit |
| GetRelTime | Gets the relative time counter. | Y | Base | $0\text{-}2^{31}$ |
| CurrentCmdQueue | Current number of empty slots in the command queue | Y | Base | 0-255 |
| GetDiscType | Gets the current disc type and sub-type. types: 0 = drive empty or unknown state 1 = DVD 2 = CD audio 3 = other 4-255 = reserved sub-types for DVD (bit | Y | Base | $0\text{-}2^{16}$ low 8 bits is an integer type; high 8 bits |

-continued

ITX Properties Summary

| ITX Property | Description | CD DA | Support Level | Range |
|---|---|---|---|---|
| | fields):<br>0 = DVD-Video<br>1 = DVD-Audio<br>2 = DVD-ROM material present<br>3 = PCFriendly<br>4 = ITX<br>5-7 = reserved<br>See section 2.1.2.4.1 for details | | | are bit fields |
| QueryNet | Gets Internet connection status<br>0 = not available, ever<br>1 = not currently avail<br>2 = available, not online<br>3 = online, speed unknown<br>4 = up to 28.8K<br>5 = up to 56K<br>6 = up to 128K<br>7 = up to 1.5 M<br>8 = up to 10 M<br>9 = >10 M | Y | Base | 0-9 |

Notes:
8. Layer Properties.
The MaxLayers property is how many simultaneous overlay layers the hardware can process or the software/hardware system can effectively emulate as simultaneous overlays in real time and blend with a full screen video. The NumLayers property returns the number of layers that can be created (but not necessarily used simultaneously) based on the amount of free memory currently available.
The concept of layer resolution is that a 720 × 480 image requires some number of bytes of data (depending on the bpp) at a resolution of 1. A resolution of 2 uses one data item for a 2 × 2 pixel area of the image (i.e. 4× less data).
This allows a layer to be defined for markup that doesn't need high accuracy and/or a method for a platform to perform graceful degradation if not enough memory is available for a full resolution layer. Resolution 3 is a 3 × 3 pixel area, and is somewhat awkward. Resolution 4 is a 4 × 4 pixel area. No other resolutions are defined.

Disc Type Detection

The GetDiscType property requires that the type of disc in the player be available to the application. A disc may be only one of the following types:
 0: drive empty or unknown state
 1: DVD
 2: CD
 3: other
For a DVD disc, any number of the DVD sub-types may be detected and have their respective bits set as follows:

Disc Sub-Types bit fields

| Bit number | Description | Detection method |
|---|---|---|
| 0 | DVD-Video | VIDEO_TS\VIDEO_TS.IFO file present |
| 1 | DVD-Audio | AUDIO_TS\AUDIO_TS.IFO file present |
| 2 | DVD-ROM material present | Any file in the main directory other than VIDEO_TS and AUDIO_TS directories |
| 3 | PCFriendly | DISC.ID file present |
| 4 | ITX | ITX.HTM file present |
| 5-7 | reserved | N/A |

Browser Requirements

Web browsers and the software environment on each platform shall be capable of the following Browser Requirements Summary

| Feature | Support Level |
|---|---|
| ITX features in para 2.1.2.2-2.1.2.4 | Base/Adv |
| Presentation layer must properly interpret HTML with embedded video | Base |
| HTML version 4.0 | Base |
| JavaScript version 1.2 | Base |
| Platform determination (navigator.platform) | Base |
| Language determination (navigator.language) | Base |
| JavaScript handlers for | |
| Methods | Base |
| Properties | Base |
| Events | Base |
| Graphic support (JPG, GIF) | Base |
| Graphic support (BMP) | Adv |
| Animated GIF support | Adv |
| XML | Adv |
| Java support | Adv |
| Streaming media support | Adv |
| Macromedia Flash | Base/Adv |
| Macromedia Shockwave | Adv |
| QuickTime | Adv |
| Interfaces to common hardware features (ID, cookie, etc.) | Base |

HTTP Header Formatting (Base)

Each HTTP header should be formatted with the following information (in addition to standard HTTP header information:
 Language
 Screen resolution
 Hardware platform identifier and version
 Browser identifier and version Cookies (Base)

Browser must be able to support cookie mechanism, which of course places a memory requirement on the hardware device. Cookie shall be placed by browser in local persistent memory and shall be readable only by a specific server and browser/hardware partner. Cookie shall contain:
 User/hardware ID: generated by computer software or by hardware platform (in case of set-top)
 Disc ID: generated by local hardware based on a hashing algorithm.
 BCA number: read from lead-in area of DVD
The following is matter of design choice.
 Format of cookie
 When to place cookie (i.e., insertion event)

Direct Connection to Navigator (Adv)
  Ability to pass commands directly to DVD/CD navigator, such as:
    All DVD/CD navigation commands
    Additionally, must have ability to set GPRMs Platform/Hardware Requirements In order to provide a consistent baseline platform for ITX content developers it is important that the platform and hardware vendors properly support the ITX API. Not all hardware platforms will have identical capabilities. So it is important that each platform provide access to the features that are available and graceful degradation for those that are not supported—and provide this as feedback so that content developers understand how their content will function on different platforms.

Baseline Hardware Platform Requirements

Hardware platform vendors must provide hardware and interfaces capable of performing all the functions specified as base above to be ITX compatible. If the feature is not available it is important that it either be emulated or degrade gracefully in some manner. Items marked as advanced can be supported or not, but the Supported Features bits must accurately indicate what features are available.

It is expected that hardware platforms meet these minimum specifications:
  Support HTML 3.2 browser and other requirements in paragraphs 3.x
  Play video full screen down to a 4:1 downscale (180×120 (NTSC), 180×144 (PAL)).

Baseline Capabilities Grouping

| bit | ITX Baseline Command Group | Command list |
|---|---|---|
| 0 | GRP_OPENVOB | Open(filename \| type) |
| 1 | GRP_TRANSPORT | Play([*]) |
|   |   | Pause ([*]) |
|   |   | Stop ([*]) |
|   |   | FastForward([x[,*]]) |
|   |   | Rewind([*[,*]]) |
|   |   | NextChapter([*]) |
|   |   | PrevChapter([*]) |
|   |   | Resume([*]) |
|   |   | StillOff([*]) |
| 2 | GRP_AUDIOTRANSPORT | NextTrack( ) |
|   |   | PrevTrack( ) |
|   |   | NextDisplay([*]) |
|   |   | PrevDisplay([*]) |
| 3 | GRP_SEARCH | TitlePlay(t[,*]) |
|   |   | ChapterPlay(t,c[,*]) |
|   |   | TimePlay(h,m,s,f[,*]) |
|   |   | Menu(x[,*]) |
| 4 | GRP_AUDIOSEARCH | TitleGroupPlay(g[,*]) |
|   |   | TrackPlay(g,t[,*]) |
| 5 | GRP_UOP | UOPMask( ) |
| 6 | GRP_SELECT | UpButtonSelect([n]) |
|   |   | DownButtonSelect([n]) |
|   |   | LeftButtonSelect([n]) |
|   |   | RightButtonSelect([n]) |
|   |   | ButtonActivate( ) |
|   |   | ButtonSelectAndActivate (n) |
| 7 | GRP_VFEATURES | SubPictureSelect(n) |
|   |   | SubPictureEnable(n) |
|   |   | AudioSelect (n) |
|   |   | AngleSelect (n) |
|   |   | MenuLanguage Select(n) |
|   |   | ParentalLevelSelect(n) |
|   |   | ParentalCountrySelect(n) |
|   |   | FullScreen(w[,*]) |
| 8 | GRP_AFEATURES | TextLanguageSelect(n) |
| 9 | GRP_PC | Close( ) |
|   |   | ShowControls(x,y[,*]) |
|   |   | ShowContextMenu( ) |
|   |   | PopUpMenu( ) |
| 10 | GRP_DOWNSCALE | From HTML embedded object width and height parameters |
|   |   | Zoom(x,y[,*]) (downscale required for baseline; upscale is advanced) |
| 11-15 | N/A | reserved (must return 0) |

Advanced Hardware Platform Requirements:

Each advanced feature requires that it be fully supported for its feature bit to be enabled. However, different playback systems may have differing levels of support for some features, such as the number of bookmarks supported or the variety of special effects supported.

Advanced Capabilities Grouping

| bit | ITX Advanced Command Group | Command list |
|---|---|---|
| 16 | GRP_FILEOPEN | Open(filename \| type) |
|   |   | Play files other than VOB and MPG. |
|   |   | Audio: |
|   |   | WAV |
|   |   | MID |
|   |   | Video: |
|   |   | AVI |
| 17 | GRP_ADVPLAY | Slow([x[,*]]) |
|   |   | SlowReverse([x[, *]]) |
|   |   | Step([n[,*]]) |
| 18 | GRP_HIDDEN | HiddenGroupPlay(g[,*]) |
|   |   | HiddenTrackPlay(g,t[,*]) |
|   |   | HiddenTimePlay (h,m,s[,*]) |
| 19 | GRP_MENU | GotoMenuID(x[,*]) |
| 20 | GRP_BOOKMARK | GotoBookMark(x[,*]) |
|   |   | SaveBookMark(x[,*]) |
| 21 | GRP_MOUSE | AutoMouseHide(b) |
| 22 | GRP_KARAOKE | KaraokeSelect(x) |
| 23 | GRP_ZOOMPAN | Zoom([x,y[,*]]) |
|   |   | Pan([x,y[,*]]) |
| 24 | GRP_BLEND | VideoBlending([a,c[,*]]) |
| 25 | GRP_LAYER | CreateLayer(b,c,r,d,p) |
|   |   | ChangePalette(b,p[,*]) |
|   |   | DestroyLayer(b) |
|   |   | ShowLayer(b[,*]) |
|   |   | HideLayer(b[,*]) |
|   |   | DisplayImage(f,b,a[,*]) |
| 26 | GRP_DRAW | SetVectorDraw(b,c,w[,*]) |
|   |   | SetVectorCorners(x1,y1, x2,y2) |
|   |   | VectorMove(x,y,b[,*]) |
|   |   | VectorDraw(x,y,b[,*]) |
| 27 | GRP_AUDIOMIX | SetMixVolume(x[,*]) |
| 28 | GRP_QUEUE | FlushCmdQueue( ) |
|   |   | SetRelTime([t]) |
|   |   | all optional timed command parameters and special effects |
| 29 | GRP_WEB | NetConnect([u[,*]]) |
| 30-31 | N/A | reserved (must return 0) |

Local Storage/Memory Requirements:

The only local storage requirement of ITX is minimal memory for the purpose of placing cookies. Optionally, the hardware platform can also support larger local memory for the purposes of caching web pages. More information: TBD.

Hardware Platform Considerations

Some set-top players may not be able to access both DVD-Video and ROM content at the same time. The application will need to permit intelligent caching, and the platform will need to provide sufficient memory.

Directory Structure for Current PCFriendly Client:

```
/ROOT
   PCFRIEND.EXE (WIN)
   PCFRIEND (MAC)
   README (MAC)
   README (WIN)
   /COMMON
      /SETUP
         LANG.INI
         SETUP_EN.BMP
         SETUP_JA.BMP
         SETUP_FR.BMP
         LIC_EN.TXT
         LIC_JA.TXT
         LIC_FR.TXT
      /CONTENT
         general content (runs on multiple platforms)
   /MAC
      /SETUP
         PCFRIENDLY PLUG IN
         FLASH 4
      /CONTENT
   /WIN
      /SETUP
         PCFRIEND.ICO
         INUNINST.EXE
         UPDATE.DAT
      /CABINETS
         MAIN.CAB
         VIDEO.CAB
         OTHER.CAB
      /THIRDPTY
         /MACROMED
            SWFLASH.EXE
         /MSIE
            /EN
            /JA
```

User Operation Control:

| | User Operation Control Summary | | | | | | | | |
|---|---|---|---|---|---|---|---|---|---|
| | DVD-Video Only | | | DVD-Audio Only | | | DVD-Audio + Video | | |
| Function | Menu | Title | Stop | AMGM | Title | Stop | AMGM | Title | Stop |
| TitlePlay | X | X | X | | X | X | X | X | X |
| Title_Group_Play | | | | | | | | | |
| PTTPlay, TrackPlay | X | X | X | | X | X | X | X | X |
| TimePlay | X | X | X | | X | X | X | X | X |
| Stop | X | X | | | X | | | X | X |
| TimeSearch | | X | | | X | | | X | |
| PTTSearch, TrackSearch | | X | | | X | | | X | |
| NextTrack | | | | | X | | | X | |
| PrevTrack | | | | | X | | | X | |
| NextPG | X | X | | | | | X | | |
| PrevPG | X | X | | | | | X | | |
| NextDisplay | | | | | | | | X | |
| PrevDisplay | | | | | | | | X | |
| ForwardScan | X | X | | | X | | X | X | |
| BackwardScan | X | X | | | X | | X | X | |
| Menu | X | X | X | | | | | X | X |
| Resume | X | | | | | | X | | |
| Up | X | X | | | | | X | X | |
| Down | X | X | | | | | X | X | |
| Left | X | X | | | | | X | X | |
| Right | X | X | | | | | X | X | |
| Enter | X | X | | | | | X | X | |
| ButtonSelectand-Activate | X | X | | | | | X | X | |
| Pause | X | X | | | X | | X | X | |
| MenuLanguage-Select | | | X | | | | | | X |
| TextLanguage-Select | | | | | | X | | | X |
| AudioChange | X | X | X | | X | X | X | X | X |
| SubpictureChange | X | X | X | | | | | X | X |
| AngleChange | X | X | X | | | | | X | |
| ParentalLevel | | | X | | | | | | |
| ParentalCountry | | | X | | | | | | |
| VideoPresenta-tionMode | X | X | X | | | | X | X | X |

-continued

| | User Operation Control Summary | | | | | | | | |
|---|---|---|---|---|---|---|---|---|---|
| | DVD-Video Only | | | DVD-Audio Only | | | DVD-Audio + Video | | |
| Function | Menu | Title | Stop | AMGM | Title | Stop | AMGM | Title | Stop |
| KaraokeMode | X | X | X | | | | | | |
| HiddenGroupPlay | | | | X | X | X | X | X | X |
| HiddenTrackPlay | | | | X | X | X | X | X | X |
| HiddenTimePlay | | | | X | X | X | X | X | X |

AMGM (Audio Manager Menu): Optional Visual Menu defined in the Audio Manager (AMG). The Audio Manager contains the information and data to control all Audio Title Sets (ATS), all Video Title Sets (VTSs) for Audio Titles and the AMGM.

Enumerations:

| | Enumerations | |
|---|---|---|
| Item | Options | Value |
| Domain | First Play | 1 |
| | Video Manager Menu | 2 |
| | Video Title Set Menu | 3 |
| | Title | 4 |
| | Stop | 5 |
| | Unknown | -1 |
| Menus | Title Menu | 2 |
| | Root Menu | 3 |
| | Subpicture Languages Menu | 4 |
| | Audio Languages Menu | 5 |
| | Angle Menu | 6 |
| | Chapter Menu | 7 |
| Play State | None | 0 |
| | Scanning | 1 |
| | Stop | 2 |
| | Pause | 3 |
| | Play | 4 |
| | Slow | 5 |
| | Step | 6 |
| | Unknown | -1 |
| Speed State | Normal Speed | 0 |
| | Double Speed | 1 |
| | Slow Forward Speed | 2 |
| | Slow Backward Speed | 3 |
| | Fast Forward Speed | 4 |
| | Fast Backward Speed | 5 |
| | Step Speed | 6 |
| | Unknown | -1 |

Figure 5:
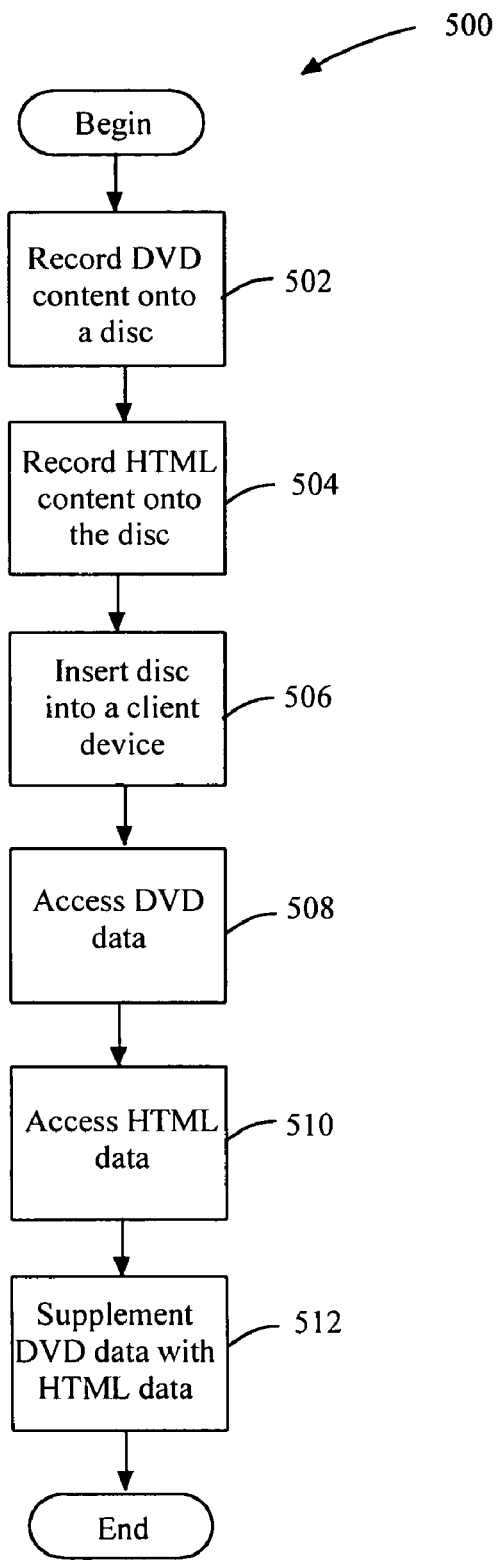
FIG. 5 is a flowchart illustrating a method for providing an enhanced multimedia experience.

With reference to FIG. 5, a process 500 is described for providing an enhanced multimedia experience. In an operation 502, DVD content is recorded onto a DVD disc. Then, in an operation, 504, the HTML content is recorded onto the same disc. Thereafter, in an operation 506, the disc is inserted into a client device. The client device can be, for example a personal computer having DVD capabilities and an Internet browser. The client device could also be a set top box. Then in an operation 508, the DVD content is accessed by DVD software present on the client device. In a step 510, the HTML data is accessed. The HTML content is preferably accessed by the browser software already present on the client device. The HTML content is can include data obtained via the Internet by the browser software under the direction of the HTML content recorded onto the disc. Also, the HTML content can consist of only the recorded HTML data with no need for Internet connection. Finally, in an operation 512, the DVD content is supplemented with the HTML content to provide an enhanced multimedia event. The HTML content can be added to the DVD content in multiple ways. For example, the HTML content can be in the form of a picture within a picture, (e.g. a relatively small window within a DVD video). The HTML content could also be update data incorporated directly into a video or could be in the form of navigation commands or relevant Internet links.

Figure 6:
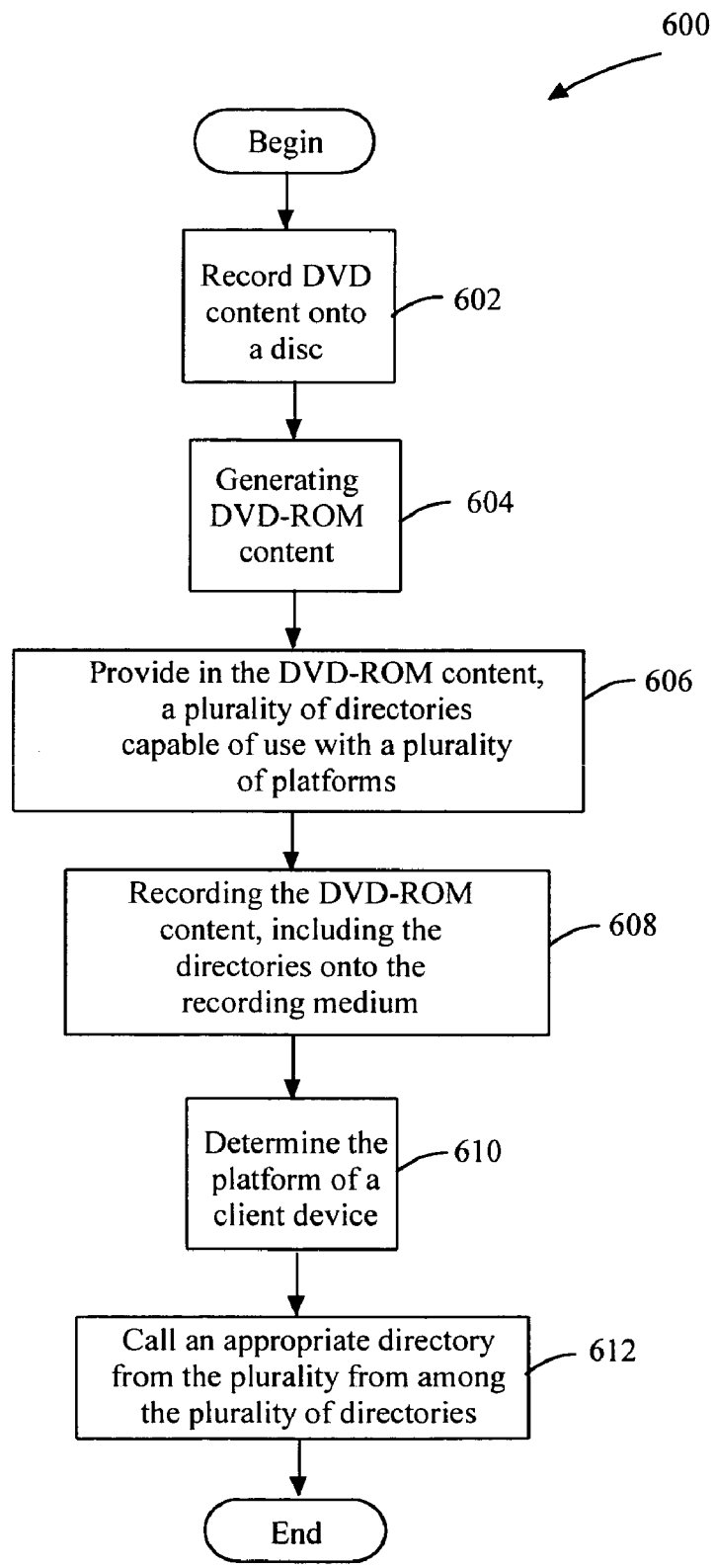
FIG. 6 is a flowchart illustrating a method for enhancing DVD content with ROM content.

With reference to FIG. 6, a general process 600 is described for enhancing DVD-content with ROM content. In an operation 602, DVD content is recorded onto a disc. The DVD content is in the form of standard DVD content familiar to those skilled in the art. Then, in an operation 604 DVD-ROM content is generated. This content is preferably HTML encoded content which can be read and operated on by standard Internet browsers. In an operation 606, a plurality of directories are incorporated into the DVD-ROM content. The directories allow operation with multiple user device platforms. The directories preferably include common directories which can be used on several platforms sharing common properties as well as platform specific directories for use with platforms having unique interface requirements. Thereafter, in an operation 608, the DVD-ROM content along with the directories is recorded onto the disc. Then, in an operation 610, the user's particular device platform is determined. This operation occurs automatically upon the user's attempt to use the disc. Then, in an operation, 612, a directory appropriate for use with the determined user device platform is selected from among the plurality of directories. This selected directory is called using Javascript function and appropriate tags associated with the directories.

While the invention herein disclosed has been described by means of specific embodiments and applications thereof, numerous modifications and variations could be made thereto by those skilled in the art without departing from the scope of the invention set forth in the claims.

What is claimed is:

1. A method for providing enhanced content for play across multiple play platforms, comprising the steps of:
    delivering media content to a client device;
    determining whether the media content is enhanced media content;
    identifying a first link to enhanced content when it is determined that the media content is enhanced media content;
    identifying a default link when it is determined that the media content is not enhanced media content;
    providing access over a network to one of the first link and the default link;

delivering HTML content over the network to the client device, the HTML content being accessible and usable by a plurality of client device platforms;

activating a browser to access the HTML content, the browser being located on and compatible for use with the client device;

activating firmware on the client device to access the media content; and incorporating the accessed HTML content with the accessed media content.

2. A method as recited in claim 1 further comprising accessing content recorded onto a recording medium by calling one of a plurality of directories, the directory being suitable for use with a platform of the client device.

3. A method as recited in claim 2 wherein more than one of the plurality of directories include additional HTML content.

4. A method as recited in claim 2 wherein the directories contain JavaScript files.

5. A method as recited in claim 2 wherein the directories comply with ISO-9660 standards.

6. A method as recited in claim 2 wherein the plurality of directories each contains a set of platform specific code segments where each set is usable by at least a different one of a plurality of different client device platforms.

7. A method as recited in claim 2 wherein the directories support hybrid Windows/Macintosh discs, preserving resource forks for Macintosh operating systems.

8. A method as recited in claim 3 wherein the additional HTML content is provided via a portable storage medium.

9. A method as recited in claim 1 wherein the network is the Internet.

10. A method as recited in claim 1 wherein the HTML content is overlaid onto the media content.

11. A method as recited in claim 1 wherein the HTML content is in the form of textual script, which scrolls in synchronization with the playback of the media content.

12. A method as recited in claim 1 wherein the HTML content scrolls synchronously with the media content and wherein selecting a portion of the HTML content navigates the user to a corresponding location in the media content.

13. A method as recited in claim 1 wherein the HTML content is in the form of an HTML page that starts a movie and checks for related Internet sites.

14. A method as recited in claim 1 wherein the HTML content includes a page that links to a website.

15. A method as recited in claim 1 further comprising accessing additional HTML content that comprises a plurality of HTML files for accommodating a plurality of platforms of client devices.

16. The method of claim 1, wherein the determining whether the media content is enhanced media content comprises determining whether a predefined enhanced content is associated with the media content, wherein the predefined enhanced content operates as a container internet page during standard playback of the media content and enables event handlers to be loaded and activated to handle events during playback.

17. The method of claim 1, wherein the default link is retrieved from memory of the client device and not accessible from the media content and not available from a medium storing the media content.

18. The method of claim 17, wherein the delivering HTML content comprises:

identifying the media content;

supplying the identification of the media content to an enhanced content source accessible through the default link such that the enhanced content source can identify the HTML content that is associated with the identification of the media content.

19. The method of claim 1, wherein the media content comprises an initial enhanced content page that starts playback of the media content.

20. The method of claim 1, wherein the HTML content comprises a media content menu that provides navigation through the media content at a finer granularity than chapters within the media content.

21. The method of claim 6, wherein the set of platform specific code segments comprise platform specific executable codes that override a standard network browser.

22. The method of claim 12, wherein the HTML content comprises textual representations of at least a portion of the media content such that a selection of a textual representation of a corresponding scene in the HTML content causes the client device to playback the corresponding scene in the media content.

23. The method of claim 22, wherein the textual representation of the portion of the media content comprises a screenplay of the portion of the media content.

24. A method for enhancing multimedia content, comprising the steps of:

providing a recording medium;

recording multimedia content onto the recording medium;

retrieving HTML content from a network;

integrating the HTML content with the multimedia content;

accessing the integrated multimedia content and HTML content, and playing the integrated multimedia content and HTML content having been accessed;

wherein the HTML content is in the form of textual content that scrolls in synchronization with the multimedia content as the multimedia content is accessed;

wherein the multimedia content is DVD content accessed by DVD firmware on a client device, wherein the method further comprises:

determining whether the DVD includes an initial HTML content;

identifying a local default home page link to a default home page; and utilizing the local default link and initially accessing from over the network the default home page when the DVD does not contain the initial HTML content, where the local default home page link is stored locally on the client device and not available through the DVD, and the default home page accessed over the network is used to implemented the retrieving of the HTML content from the network.

25. A method for enhancing multimedia content as recited in claim 24 further including the step of recording additional HTML content onto the recording medium.

26. A method for enhancing multimedia content as recited in claim 24 wherein the HTML content is provided from a remote server via the network.

27. A method for enhancing multimedia content as recited in claim 24, wherein:

the textual content of the HTML content is a textual script of the DVD content; and selection of a portion of the textual script navigates the multimedia content to a corresponding location in the multimedia content.

28. A method for enhancing multimedia content as recited in claim 25 wherein accessing the multimedia content activates the additional HTML content, linking the user to a server providing the HTML content corresponding to the multimedia content.

29. A method for enhancing multimedia content as recited in claim 24 wherein the playing of the multimedia content comprises sending events that allow the HTML content to be synchronized with the multimedia content.

30. A method as recited in claim 29, wherein the events comprise notification of various playback conditions.

31. The method of claim 24, wherein the retrieving HTML content from a network and the integrating the HTML content with the multimedia content comprises activating the retrieving and the integrating of the HTML content without user interaction.

32. A software system stored on a computer readable medium comprising:
  a medium that embodies a computer program for input to a computer; and
  a computer program stored on the medium comprising codes for causing the computer to perform steps comprising:
  delivering media content to a client device;
  determining whether the media content is enhanced media content;
  identifying a first link to enhanced content when it is determined that the media content is enhanced media content;
  identifying a default link when it is determined that the media content is not enhanced media content;
  providing access over a network to one of the first link and the default link;
  delivering HTML content over a distributed network to the client device, the HTML content being accessible and usable by a plurality of client device platforms;
  activating a browser to access the HTML content, the browser being located on and compatible for use with the client device;
  activating firmware on the client device to access the media content; and incorporating the accessed HTML content with the accessed media content.

33. The software system as recited in claim 32, wherein the media content is stored on the computer-readable medium.

34. The software system as recited in claim 32, wherein the computer program further causes the computer to perform steps further comprising:
  accessing additional HTML content stored on the computer-readable medium.

35. The software system as recited in claim 34, wherein the multimedia content and the additional HTML content are stored in multiple directories compatible with multiple client device platforms where the plurality of directories each contains a set of platform specific executable codes where each set is usable by at least a different one of a plurality of different client device platforms and a general purpose platform that contains a set of general purpose executable codes that is usable by one or more additional client device platforms in addition to the plurality of different client device platforms.

36. The software system as recited in claim 32, wherein the computer program further causes the computer to perform steps further comprising:
  accessing additional HTML content stored on the client device.

37. The software system as recited in claim 32, wherein the computer-readable medium is a DVD.

* * * * *